US011392297B2

(12) United States Patent
Yang et al.

(10) Patent No.: US 11,392,297 B2
(45) Date of Patent: *Jul. 19, 2022

(54) AUTOMATIC STREAM DETECTION AND ASSIGNMENT ALGORITHM

(71) Applicant: Samsung Electronics Co., Ltd., Suwon-si (KR)

(72) Inventors: Jingpei Yang, Santa Clara, CA (US); Changho Choi, San Jose, CA (US); Rajinikanth Pandurangan, Fremont, CA (US); Vijay Balakrishnan, Mountain View, CA (US); Ramaraj Pandian, Cupertino, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 16/856,020

(22) Filed: Apr. 22, 2020

(65) Prior Publication Data

US 2020/0249839 A1 Aug. 6, 2020

Related U.S. Application Data

(63) Continuation of application No. 15/499,877, filed on Apr. 27, 2017, now Pat. No. 10,656,838, which is a (Continued)

(51) Int. Cl.
G06F 3/06 (2006.01)
G06F 13/18 (2006.01)
G06F 12/02 (2006.01)

(52) U.S. Cl.
CPC ............ *G06F 3/061* (2013.01); *G06F 3/0611* (2013.01); *G06F 3/0655* (2013.01); (Continued)

(58) Field of Classification Search
CPC ........ G06F 3/061; G06F 3/0611; G06F 13/18; G06F 3/0659; G06F 12/0246; (Continued)

(56) References Cited

U.S. PATENT DOCUMENTS 6,484,235 B1 11/2002 Horst et al.
8,615,638 B2 12/2013 Shirlen et al.
(Continued)

FOREIGN PATENT DOCUMENTS

CN 104461393 A 3/2015
CN 104809075 A 7/2015
(Continued)

OTHER PUBLICATIONS

Final Office Action for U.S. Appl. No. 15/389,270, dated Jul. 14, 2020.
(Continued)

*Primary Examiner* — Tasnima Matin
(74) *Attorney, Agent, or Firm* — Renaissance IP Law Group LLP

(57) ABSTRACT

A Solid State Drive (SSD) is disclosed. The SSD may include flash memory to store data and may support a plurality of device streams. A SSD controller may manage reading and writing data to the flash memory, and may store a submission queue and a chunk-to-stream mapper. A flash translation layer may include a receiver to receive a write command, an LBA mapper to map an LBA to a chunk identifier (ID), stream selection logic to select a stream ID based on the chunk ID, a stream ID adder to add the stream ID to the write command, a queuer to place the chunk ID in the submission queue, and background logic to update the chunk-to-stream mapper after the chunk ID is removed from the submission queue.

21 Claims, 21 Drawing Sheets

Related U.S. Application Data continuation-in-part of application No. 15/344,422, filed on Nov. 4, 2016, now Pat. No. 10,282,324, which is a continuation-in-part of application No. 15/144,588, filed on May 2, 2016, said application No. 15/499,877 is a continuation-in-part of application No. 15/090,799, filed on Apr. 5, 2016, now Pat. No. 10,509,770.

(60) Provisional application No. 62/245,100, filed on Oct. 22, 2015, provisional application No. 62/192,045, filed on Jul. 13, 2015, provisional application No. 62/458,566, filed on Feb. 13, 2017, provisional application No. 62/471,350, filed on Mar. 14, 2017, provisional application No. 62/383,302, filed on Sep. 2, 2016.

(52) U.S. Cl.
CPC ......... *G06F 3/0659* (2013.01); *G06F 3/0679* (2013.01); *G06F 3/0688* (2013.01); *G06F 12/0246* (2013.01); *G06F 13/18* (2013.01); *G06F 2212/1016* (2013.01); *G06F 2212/1036* (2013.01); *G06F 2212/7201* (2013.01); *G06F 2212/7202* (2013.01); *G06F 2212/7205* (2013.01)

(58) Field of Classification Search
CPC .... G06F 3/0679; G06F 3/0655; G06F 3/0688; G06F 2212/7205; G06F 2212/7201; G06F 2212/1036; G06F 2212/1016; G06F 2212/7202
See application file for complete search history.

(56) References Cited

U.S. PATENT DOCUMENTS

| | | |
|---|---|---|
| 8,837,287 B2 | 9/2014 | Dolganow et al. |
| 8,874,835 B1 | 10/2014 | Davis et al. |
| 8,966,201 B2 | 2/2015 | Sela et al. |
| 9,003,159 B2 | 4/2015 | Deshkar et al. |
| 9,015,311 B2 | 4/2015 | Muniraja |
| 9,105,305 B2 | 8/2015 | Werner et al. |
| 9,141,528 B2 | 9/2015 | Gorobets et al. |
| 9,176,864 B2 | 11/2015 | Gorobets et al. |
| 9,183,136 B2 | 11/2015 | Kawamura et al. |
| 9,201,804 B1 | 12/2015 | Egyed |
| 9,436,634 B2 | 9/2016 | Canepa et al. |
| 9,495,102 B2 | 11/2016 | Bisht |
| 9,501,230 B2 | 11/2016 | Hashimoto |
| 9,521,201 B2 | 12/2016 | Ori |
| 9,563,397 B1 | 2/2017 | Stoev et al. |
| 9,851,909 B2 | 12/2017 | Saxena et al. |
| 10,311,545 B2 | 6/2019 | Yoon et al. |
| 2007/0016754 A1 | 1/2007 | Testardi |
| 2009/0222617 A1 | 9/2009 | Yano et al. |
| 2012/0072662 A1 | 3/2012 | Jess et al. |
| 2012/0072798 A1 | 3/2012 | Unesaki et al. |
| 2012/0191900 A1 | 7/2012 | Kunimatsu et al. |
| 2012/0254524 A1 | 10/2012 | Fujimoto |
| 2013/0159626 A1 | 6/2013 | Katz et al. |
| 2013/0166856 A1 | 6/2013 | Lim et al. |
| 2013/0326169 A1 | 12/2013 | Shaharabany et al. |
| 2014/0019701 A1 | 1/2014 | Ohira et al. |
| 2014/0082261 A1 | 3/2014 | Cohen et al. |
| 2014/0281302 A1 | 9/2014 | Horn |
| 2014/0304469 A1 | 10/2014 | Wu |
| 2015/0074337 A1 | 3/2015 | Jo et al. |
| 2015/0149605 A1 | 5/2015 | de La Iglesia |
| 2015/0169230 A1* | 6/2015 | Asnaashari ........... G06F 3/0688 711/103 |
| 2015/0169449 A1* | 6/2015 | Barrell ................ G06F 12/0806 711/143 |
| 2015/0309742 A1 | 10/2015 | Amidi et al. |
| 2016/0139838 A1 | 5/2016 | D'Sa et al. |
| 2016/0162203 A1 | 6/2016 | Grimsrud |
| 2016/0170639 A1 | 6/2016 | Velayudhan et al. |
| 2016/0179386 A1 | 6/2016 | Zhang |
| 2016/0179678 A1 | 6/2016 | Camp et al. |
| 2016/0203053 A1 | 7/2016 | Talagala et al. |
| 2016/0266792 A1* | 9/2016 | Amaki ................ G06F 3/0608 |
| 2016/0283124 A1 | 9/2016 | Hashimoto et al. |
| 2016/0283125 A1 | 9/2016 | Hashimoto et al. |
| 2016/0306552 A1 | 10/2016 | Liu et al. |
| 2016/0313943 A1 | 10/2016 | Hashimoto et al. |
| 2016/0328156 A1 | 11/2016 | Swarbrick et al. |
| 2016/0357437 A1 | 12/2016 | Doerner |
| 2017/0024141 A1 | 1/2017 | Davis et al. |
| 2017/0109096 A1 | 4/2017 | Jean et al. |
| 2017/0123666 A1 | 5/2017 | Sinclair et al. |
| 2017/0161100 A1 | 6/2017 | Rashid et al. |
| 2017/0228157 A1 | 8/2017 | Fang et al. |
| 2017/0308722 A1 | 10/2017 | Oikawa et al. |
| 2017/0344470 A1 | 11/2017 | Yang et al. |
| 2018/0074700 A1 | 3/2018 | Tsalmon et al. |

FOREIGN PATENT DOCUMENTS

| | | |
|---|---|---|
| CN | 105446890 A | 3/2016 |
| CN | 105446938 A | 3/2016 |
| JP | 2006235960 A | 9/2006 |
| JP | 2013539148 A | 10/2013 |
| JP | 5723812 B2 | 5/2015 |
| KR | 20130121105 A | 11/2013 |
| KR | 101544309 B1 | 8/2015 |
| TW | 201227297 A | 7/2012 |
| TW | 201308074 A | 2/2013 |
| TW | 201324150 A | 6/2013 |
| TW | 201604688 A | 2/2016 |
| WO | 2012020544 A1 | 2/2012 |
| WO | 2012039216 A1 | 3/2012 |
| WO | 2015005634 A1 | 1/2015 |

OTHER PUBLICATIONS

Notice of Allowance for U.S. Appl. No. 15/389,270, dated Aug. 12, 2020.
Advisory Action for U.S. Appl. No. 15/389,270, dated Jan. 21, 2020.
Ex parte Quayle Action for U.S. Appl. No. 15/499,877, mailed Apr. 29, 2019.
Final Office Action for U.S. Appl. No. 15/230,347, dated Apr. 18, 2018.
Final Office Action for U.S. Appl. No. 15/389,270, dated Feb. 6, 2019.
Final Office Action for U.S. Appl. No. 15/389,270, dated Oct. 31, 2019.
Kang, Jeong-Uk et al., "The Multi-streamed Solid-State Drive," Memory Solutions Lab., Memory Division, Samsung Electronic Co., 5 pages.
Megiddo, Nimrod et al., "ARC: A Self-Tuning, Low Overhead Replacement Cache", Fast '03 Proceedings of the 2nd USENIX Conference on File and Storage Technologies, Mar. 31, 2003, pp. 115-130.
Notice of Allowance for U.S. Appl. No. 15/230,347, dated Jan. 24, 2019.
Notice of Allowance for U.S. Appl. No. 15/499,877, dated Jan. 8, 2020.
Notice of Allowance for U.S. Appl. No. 15/499,877, dated Sep. 12, 2019.
Office Action for U.S. Appl. No. 15/230,347, dated Dec. 13, 2017.
Office Action for U.S. Appl. No. 15/230,347, dated Sep. 6, 2018.
Office Action for U.S. Appl. No. 15/389,270, dated Apr. 2, 2020.
Office Action for U.S. Appl. No. 15/389,270, dated Jun. 21, 2019.
Office Action for U.S. Appl. No. 15/389,270, dated Sep. 7, 2018.
Office Action for U.S. Appl. No. 15/499,877, dated Oct. 4, 2018.
Yang, Fei et al., "Multi-streaming RocksDB," Memory Solutions Group, Samsung Research Center, 2 pages.

(56) References Cited

OTHER PUBLICATIONS

Yoo, Sanghyun et al., "Block Replacement Scheme based on Reuse Interval for Hybrid SSD System", Journal of Internet Computing and Services, vol. 16, Issue 5, 2015, pp. 19-27.

* cited by examiner

| SFR Table | | | | |
|---|---|---|---|---|
| Chunk ID 515-1 | Stream ID 530-1 | Current Access Time 810-1 | Previous Access Time 815-1 | Access Count 820-1 |
| Chunk ID 515-2 | Stream ID 530-2 | Current Access Time 810-2 | Previous Access Time 815-2 | Access Count 820-2 |
| Chunk ID 515-3 | Stream ID 530-3 | Current Access Time 810-3 | Previous Access Time 815-3 | Access Count 820-3 |
| Chunk ID 515-4 | Stream ID 530-4 | Current Access Time 810-4 | Previous Access Time 815-4 | Access Count 820-4 |
| ⋮ | ⋮ | ⋮ | ⋮ | ⋮ |

805

AUTOMATIC STREAM DETECTION AND ASSIGNMENT ALGORITHM

RELATED APPLICATION DATA

This application is a continuation of U.S. patent application Ser. No. 15/499,877, filed Apr. 27, 2017, now allowed, which claims the benefit of U.S. Provisional Patent Application Ser. No. 62/458,566, filed Feb. 13, 2017, and U.S. Provisional Patent Application Ser. No. 62/471,350, filed Mar. 14, 2017, all of which are incorporated by reference herein for all purposes.

U.S. patent application Ser. No. 15/499,877, filed Apr. 27, 2017 is also a continuation-in-part of U.S. patent application Ser. No. 15/344,422, filed Nov. 4, 2016, now U.S. Pat. No. 10,282,324, issued May 7, 2019, which claims the benefit of U.S. Provisional Patent Application Ser. No. 62/383,302 and which is a continuation-in-part of U.S. patent application Ser. No. 15/144,588, filed May 2, 2016, which claims the benefit of U.S. Provisional Patent Application Ser. No. 62/245,100, filed Oct. 22, 2015 and U.S. Provisional Patent Application Ser. No. 62/192,045, filed Jul. 13, 2015, all of which are incorporated by reference herein for all purposes.

U.S. patent application Ser. No. 15/499,877, filed Apr. 27, 2017 is also a continuation-in-part of U.S. patent application Ser. No. 15/090,799, filed Apr. 5, 2016, now U.S. Pat. No. 10,509,770, issued Dec. 17, 2019, which claims the benefit of U.S. Provisional Patent Application Ser. No. 62/245,100, filed Oct. 22, 2015 and U.S. Provisional Patent Application Ser. No. 62/192,045, filed Jul. 13, 2015, all of which are incorporated by reference herein for all purposes.

FIELD

The inventive concepts relate generally to Solid State Drives (SSDs), and more particularly to managing streams in multi-stream SSDs.

BACKGROUND

Multi-streaming Solid State Drives (SSDs) allow smart placement of incoming data to minimize the effect of internal garbage collection (GC) and to reduce write amplification. Multi-streaming may be achieved by adding a simple tag (a stream ID) to each of the write commands sent from the host to the SSD. Based on this tag, the SSD may group data into common blocks.

But to take advantage of multi-stream devices, the applications must be aware that the SSD supports multi-streaming, so that the software sources may assign common streams to data with similar properties, such as data lifetime. Making software multi-stream-aware requires modifying the software. But modifying any software carries the risk of making unintended changes to the operation of the software. And given the sheer number of different software products on the market, expecting even a small number of these software products to be modified to support multi-streaming seems an unlikely proposition at best.

A need remains for a way to support multi-streaming without the software requiring modification.

DETAILED DESCRIPTION

Figure 1:
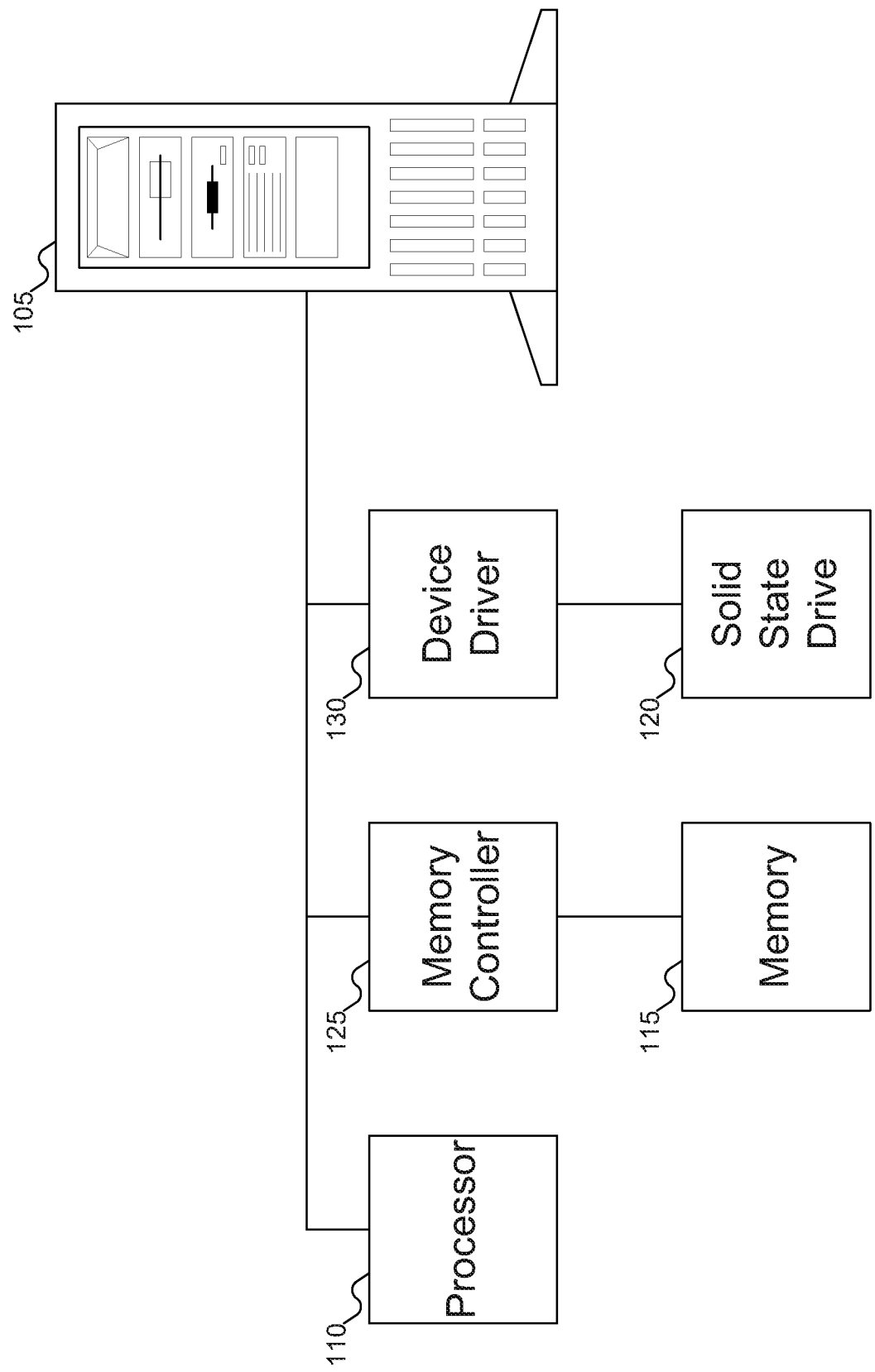
FIG. 1 shows a machine with a Solid State Drive (SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

An apparatus and method for performing automatic stream detection and assignment independent of application layer is proposed. The stream assignment may be based on runtime workload detection and may be independent of the application(s). The stream assignment may be applied to multi-stream enabled Solid State Drive (SSDs).

Implementation of the stream assignment protocol has several advantages. First, applications do not have to be modified at all. But applications that assign their own stream priority may be factored into the approach. For example, the stream assignment protocol may defer outright to the application-assigned stream priority. Or, the stream assignment protocol may perform a weighted sum combining the application-assigned stream priority and the calculated stream assignment, using any desired weight values.

Second, any application that otherwise uses multi-stream enabled devices could take advantages of auto stream detection and assignment. Third, applications do not need to be aware of stream-related information from hardware. Fourth, the stream assignment protocol may manage each multi-stream-enabled SSD separately, enabling applications to use multiple SSDs, and even to mix multi-stream-enabled and non-multi-stream-enabled SSDs. Fifth, the stream assignment may be performed at any desired layer of the system, such as in the file system, in a block layer, in a device driver, inside the SSD (for example, within the flash translation layer), and so on, provided the starting address of the write command (or a file offset, if the stream assignment protocol is implemented in the file system layer) may be identified.

The entire address space of the SSD may be divided into a number of fixed size chunks. This chunk size may be any desired size: for example, a multiple of a 512-byte sector. The starting logical block address (LBA) of a request may be converted to a chunk identifier (ID) by dividing the LBA by the number of sectors per chunk, or more generally, by the chunk size.

In a first embodiment of the inventive concept, a Sequential, Frequency, and Recency (SFR) approach may be used to determine stream assignment:

Sequentiality: If the starting LBA of a new request is adjacent to a previous request's ending LBA (i.e., the write commands involve sequential writes), the second write command may be assigned the same stream ID as the earlier write command. This approach assumes that a group of sequential requests have similar life time if they are issued within a short period of time. Since write commands may be issued by different sources (applications, file systems, virtual machines, etc.) and may be intermixed, from the point of view of the SSD the write commands might not follow a strict sequential pattern. To account for this possibility, sequentiality may be determined relative to a number of previous commands within a window (whose size may vary). For example, a window size of four will check whether the incoming request is sequential to any of the previous four requests.

Frequency: Frequency refers to the number of times a starting LBA has been accessed. Frequency may be measured as access counts. Whenever a chunk is accessed (written), the access count for that chunk is incremented by 1. Higher access counts indicate a shorter life time for that chunk. Frequency thus reflects the temperature of a data chunk.

Recency: Recency indicates the temporal locality of data chunks. For example, one chunk may be accessed more frequently in a certain period of time and accumulate a high access count, but be inactive afterward. In this situation, it is not desirable to keep the chunk in the hot stream for a long time. A chunk is considered hot only if it is accessed frequently within the most recent period of time. In one embodiment of the inventive concept, a decay period may be predefined for all chunks. If a chunk is not accessed within the last N decay periods, the access count will be divided by $2^N$.

The stream ID for a chunk may be determined by both frequency and recency (and sequentiality, if applicable). Frequency promotes a chunk to a hotter stream if it is accessed frequently, while recency demotes that chunk to a colder stream if it is inactive during the last decay period. In one embodiment of the inventive concept, a log scale may be used to convert the access count to a stream ID, which may reflect the fact that the number of device streams is far smaller than the range of values for access counts. Thus, for example:

$$\text{Recency weight} = 2^{((current\ time - last\ access\ time)/decay\ period)}$$

$$\text{Stream ID} = \log(\text{access count}/\text{recency weight})$$

Update of the stream ID for a chunk may run as background tasks, minimizing the impact on input/output (I/O) performance.

In a second embodiment of the inventive concept, a multi-queue approach may be used. For each device stream, a queue may be defined: since there are multiple device streams, there will be multiple queues. The multi-queue algorithm may be divided into two different functional modules. One module take care of promoting each chunk from a lower queue to a higher queue; the other module handles demotion of less active or inactive chunks from a higher queue to a lower queue. The higher the chunk's access count, the hotter the chunk is considered to be, and therefore the chunk is placed in a higher queue. Both promotion and demotion may run as background tasks, minimizing the impact on I/O performance.

When a chunk is first accessed, it is assigned to stream 0 (the lowest stream) and placed in the corresponding queue. Otherwise, the chunk is removed from the current queue, its access count is updated, and the chunk is placed a (potentially) new queue. Any approach may be used to determine the appropriate queue based on the access count: for example, the log of the access count may be calculated as the new stream ID (which identifies the corresponding queue). The promotion module may also check to see if the chunk is the currently hottest chunk (based on access count). If so, then the device lifetime may be set based on the interval between accesses of this chunk. Finally, the promotion logic may determine the expiration time of the chunk, based on the device lifetime and the last access time of the chunk.

To demote a chunk, the demotion module examines chunks as they reach the head of their queue. If that chunk has not yet passed its expiration time the chunk may be left alone. Otherwise, the chunk may be removed from its current queue, assigned a new expiration time, and demoted to a lower queue (i.e., assigned a lower stream ID).

In addition, if the chunk being demoted was the hottest chunk, then the chunk has not been accessed in a while (as determined by the expiration time). Therefore, the chunk is no longer hot, and another chunk from that queue may be selected as the hottest chunk (with appropriate ramifications for the device lifetime). This newly selected hottest chunk may be the next chunk in that queue, or it may be the last chunk to enter that queue.

FIG. 1 shows a machine with a Solid State Drive (SSD), according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and Solid State Drive (SSD) 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM. Memory 115 may also be any desired combination of different memory types. Memory 115 may be controlled by memory controller 125, also part of machine 105.

SSD 120 may be any variety of SSD, and may even be extended to include other types of storage that perform garbage collection (even when not using flash memory). SSD 120 may be controlled by device driver 130, which may reside within memory 115.

Figure 2:
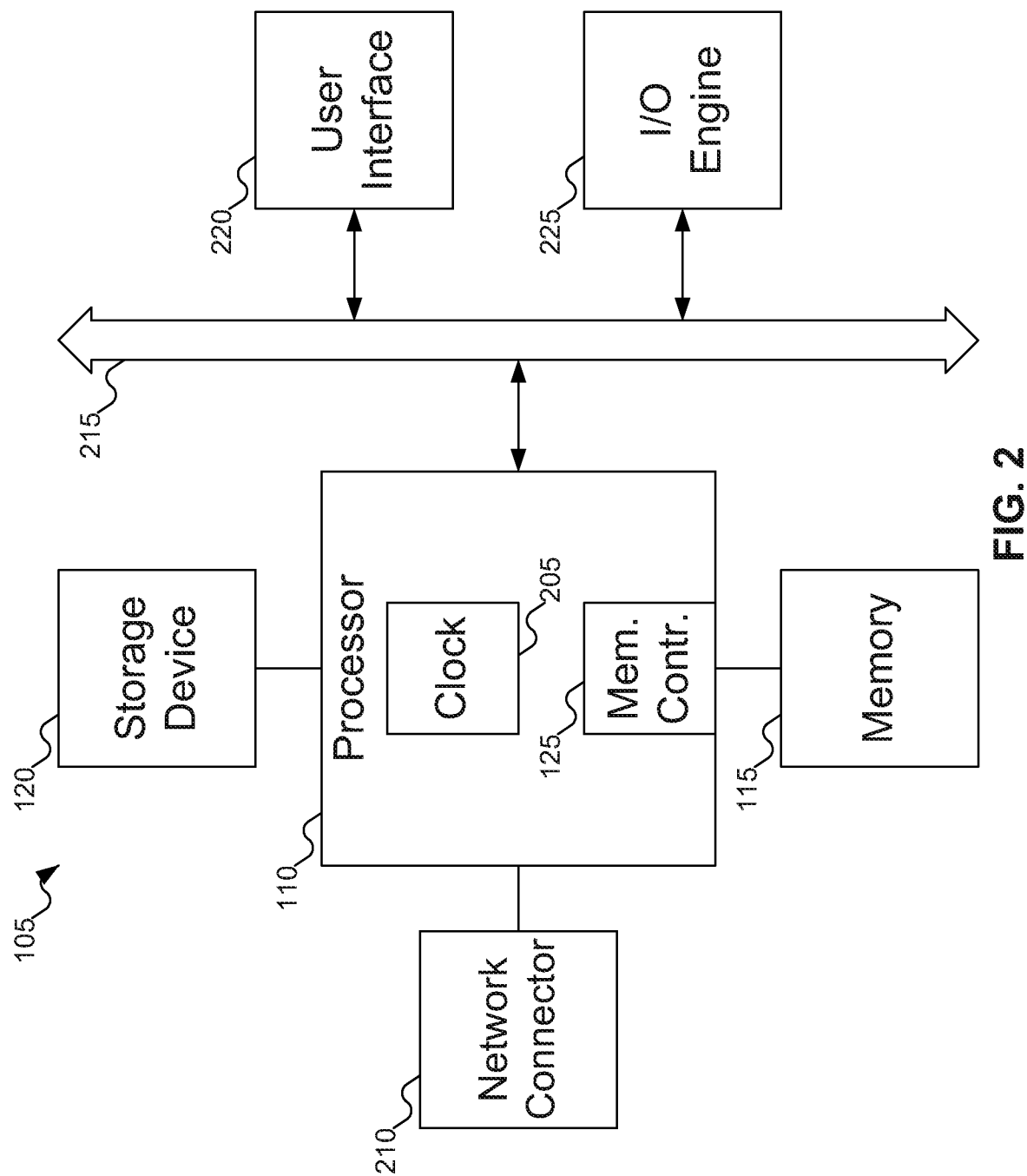
FIG. 2 shows additional details of the machine of FIG. 1.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

Figure 3:
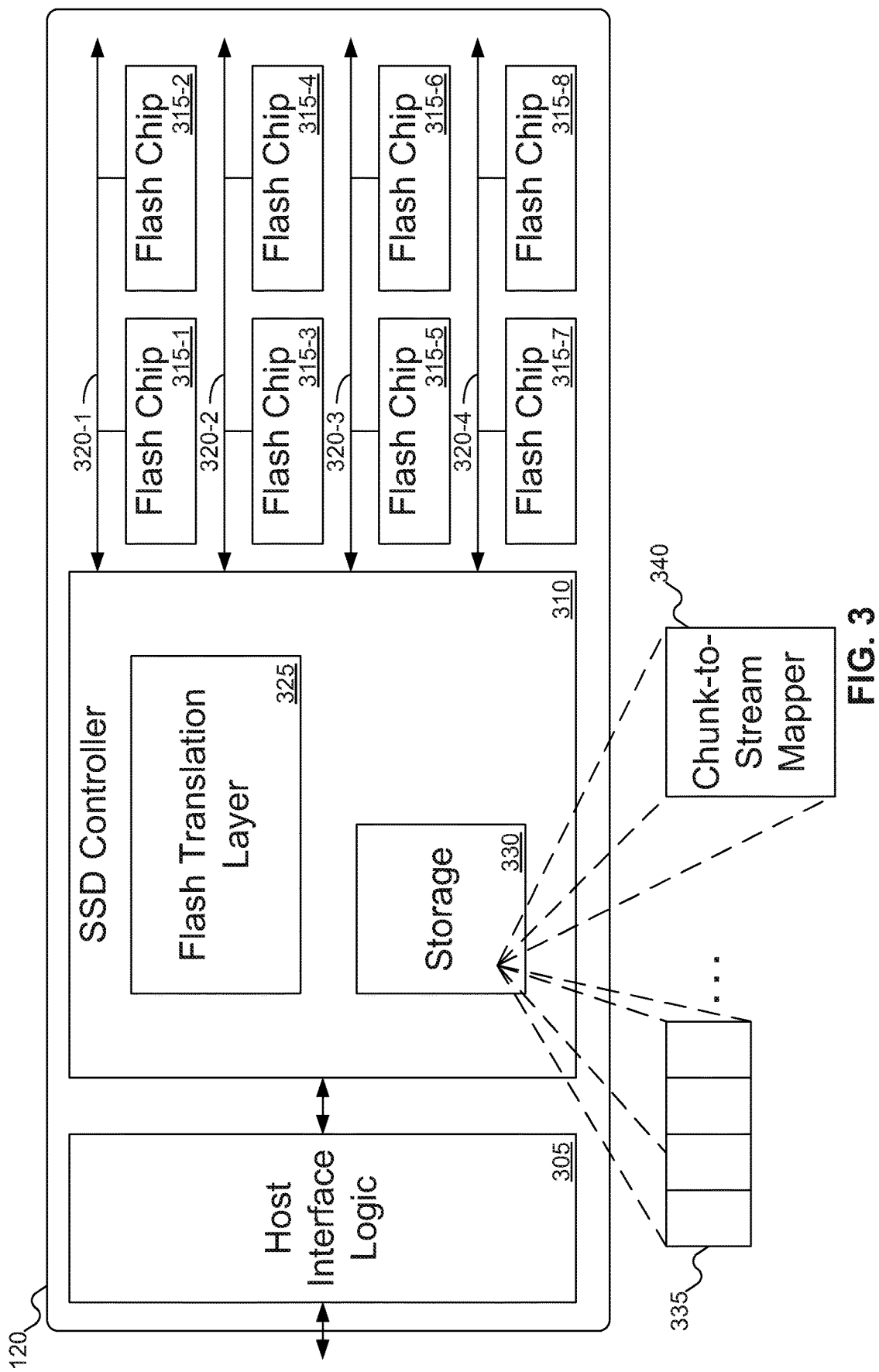
FIG. 3 shows details of the SSD of FIG. 1.

FIG. 3 shows details of SSD 120 of FIG. 1. In FIG. 3, SSD 120 may include host interface logic 305, SSD controller 310, and various flash memory chips 315-1 through 315-8, which may be organized into various channels 320-1 through 320-4. Host interface logic 305 may manage communications between SSD 120 and machine 105 of FIG. 1. SSD controller 310 may manage the read and write operations, along with garbage collection operations, on flash memory chips 315-1 through 315-8. SSD controller 310 may include flash translation layer 325 to perform some of this management. In embodiments of the inventive concept that have SSD 120 responsible for assigning write commands to streams, SSD controller 310 may include storage 330 to support stream assignment. Storage 330 may include submission queue 335, and chunk-to-stream mapper 340. Submission queue 335 may be used to store information about chunks affected by various write commands. As write commands are received, the chunks (or rather, identifiers (IDs) of these chunks) associated with those write commands may be placed in submission queue 335. Then, as part of a background process (to minimize the impact on foreground operations), chunks may be removed from submission queue 335 and the stream assignments for these chunks may be updated. Chunk-to-stream mapper 340 may store information about what streams are currently assigned to various chunks: this information may be updated as a result of chunk IDs in submission queue 335 (or the lack of chunk IDs in submission queue 335—chunks that are not being used may be assigned to lower priority streams as a result of non-use). The concept of chunks is discussed further with reference to FIGS. 5 and 7 below.

While FIG. 3 shows SSD 120 as including eight flash memory chips 315-1 through 315-8 organized into four channels 320-1 through 320-4, embodiments of the inventive concept may support any number of flash memory chips organized into any number of channels.

Figure 4:
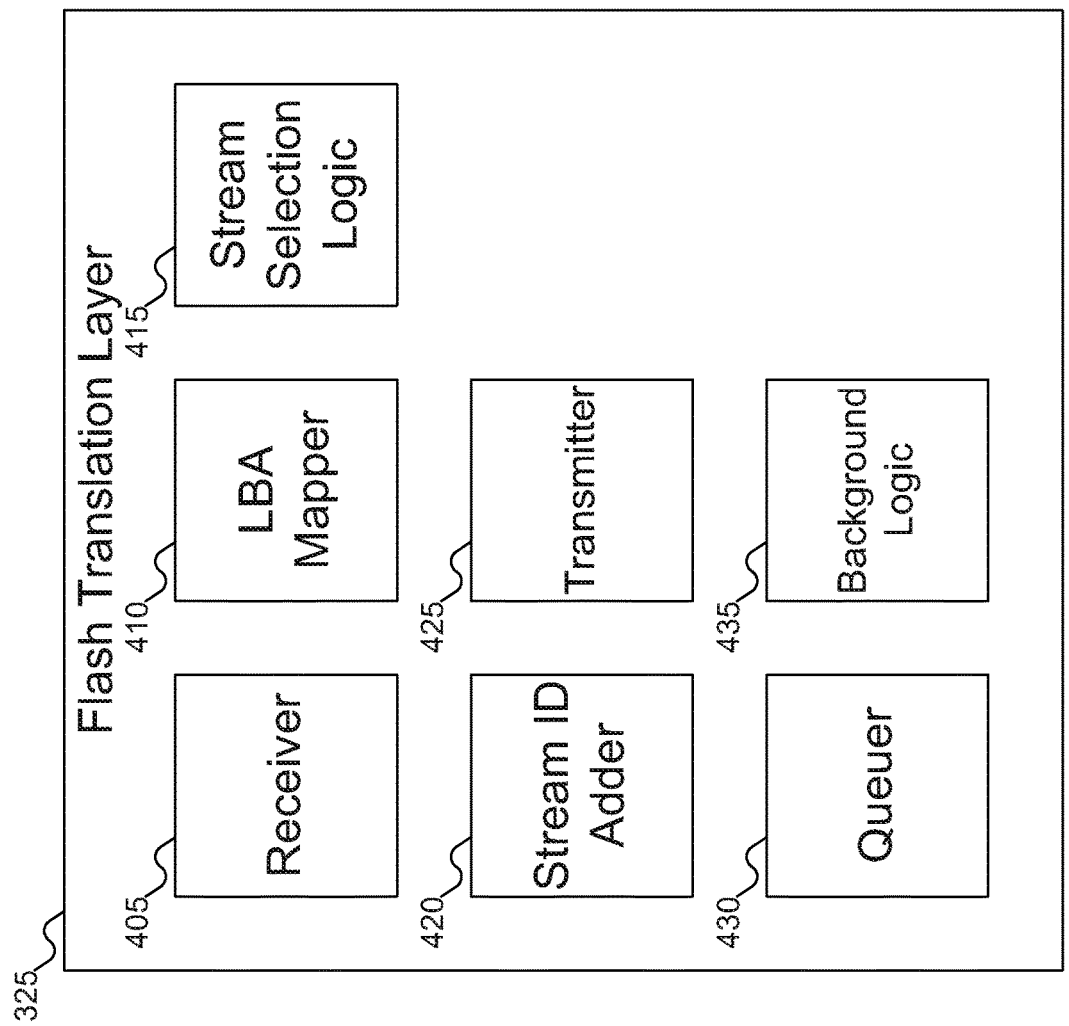
FIG. 4 shows details of the flash translation layer of FIG. 3.

FIG. 4 shows details of flash translation layer 325 of FIG. 3. In FIG. 4, flash translation layer 325 is shown as including receiver 405, logical block address (LBA) mapper 410, stream selection logic 415, stream ID adder 420, transmitter 425, queuer 430, and background logic 435. Receiver 405 may receive write commands from various software sources, such as operating systems, applications, file systems, remote machines, and other such sources. For a given write command, LBA mapper 410 may map an LBA used in the write command to a particular chunk on SSD 120 of FIG. 1. Stream selection logic 415 may then select a stream appropriate to the chunk. Stream selection logic 415 may use chunk-to-stream mapper 340 of FIG. 3 to accomplish this stream selection, and may include logic to search chunk-to-stream mapper 340 of FIG. 3 to find an entry corresponding to the selected chunk. Alternatively, stream selection logic 415 may use other approaches: for example, by calculating the stream ID from an access count for the chunk (similar to what is described with reference to FIG. 13 below), or by assigning streams in a round robin approach (to distribute write commands evenly over all device streams). Stream ID adder 420 may then add the selected stream ID to the write command, using logic to write data into the write command. Once the stream ID has been attached to the write command, transmitter 425 may transmit the write command (with the attached stream ID) toward SSD 120 of FIG. 1 for execution.

Queuer 430 may take the identified chunk ID for the write command, and may add that chunk ID to submission queue 335 of FIG. 3. Queuer 430 may use logic to add the chunk ID to submission queue 335 of FIG. 3. For example, queuer 430 may include a pointer to the tail of submission queue 335 of FIG. 3 and may write the chunk ID into the tail of submission queue 335 of FIG. 3 after which the pointer to the tail of submission queue 335 of FIG. 3 may be updated to point to the next slot in submission queue 335 of FIG. 3. Eventually, the chunk ID will be de-queued from submission queue 335 of FIG. 3, after which background logic 435 may operate on the de-queued chunk ID. Background logic 435 is discussed further with reference to FIGS. 9 and 15 below.

Background logic 435 may be implemented in any desired manner. For example, background logic 435 might operate as simply as incrementing a chunk whenever that chunk is accessed (which would involve little more than logic to perform a lookup in a data structure storing chunk IDs and stream IDs and an incrementer to increment the stream ID located in that manner). But such a simple implementation would mean that eventually every chunk would use the highest numbered stream, with the lower numbered streams not being used. More involved implementations may consider whether a chunk is not being used much and may reduce the chunk's stream priority to match. Two embodiments of the inventive concept that implement background logic 435 in different manners to achieve this result are described below with reference to FIGS. 8-13 and 14-20.

While background logic 435 is described as operating in the "background" (hence the name), performing stream assignment updates in the background is a convenience to minimize the impact on reads and writes to SSD 120 of FIG. 1. Provided that stream assignments could be updated without impacting the performance of SSD 120 of FIG. 1, there is no reason background logic 435 could not operate in the "foreground". For example, if SSD 120 of FIG. 1 includes a processor (that is, SSD 120 of FIG. 1 offers In-Storage Computing (ISC)), this processor in SSD 120 of FIG. 1 could potentially be dedicated to updating stream assignments in real time without impacting the read and write performance of SSD 120 of FIG. 1. In such a situation, background logic 435 could operate immediately to perform the stream assignment update without needing to place the chunk ID in submission queue 335 of FIG. 3 or to wait for a time when background logic 435 may operate without affecting foreground operations.

In FIG. 4, flash translation layer 325 is shown as responsible for performing the stream assignment and stream ID update. But in other embodiments of the inventive concept, one or more of the components shown in FIG. 4 may be implemented in software and be included as part of, for example, memory controller 125 of FIG. 1, device driver 130 of FIG. 1, or implemented as library routines that may intercept write requests and combine streams before issuing write commands, or implemented as separate special purpose hardware, either within SSD 120 of FIG. 1 or elsewhere within machine 105. For purposes of this discussion, any reference to the stream assignment performed by the components of FIG. 4 is intended to encompass implementation at any specific location, even though the description accompanying FIGS. 4-20 focuses on implementation within flash translation layer 325.

While FIG. 4 shows LBA mapper 410 and stream selection logic 415 as separate components, logically the structure of these components may be combined into a single component. More generally, embodiments of the inventive concept may combine any components shown and described in FIGS. 4-6, 9-13, and 15-20 as separate into unitary components.

Figure 5:
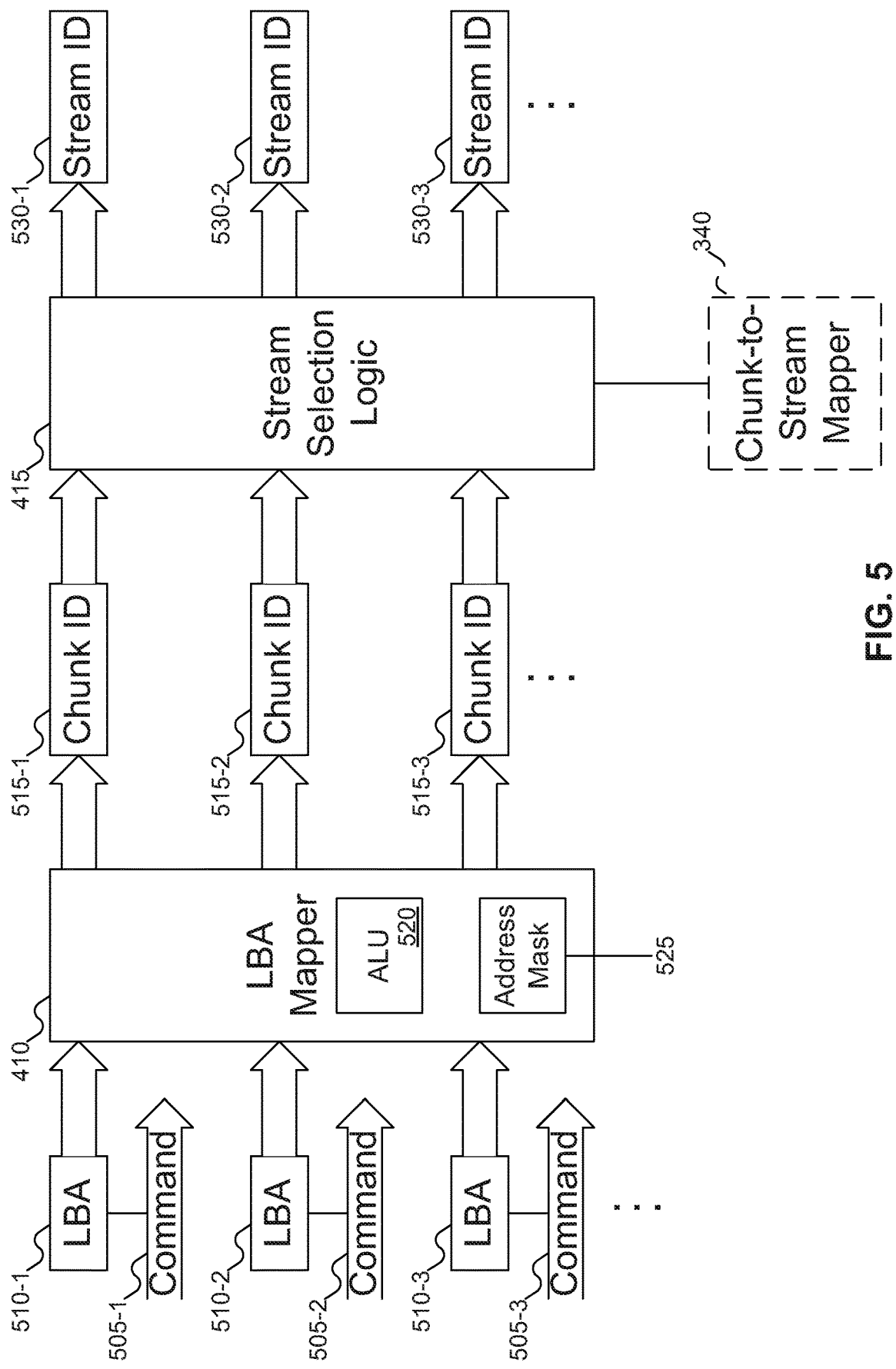
FIG. 5 shows the logical block addresses (LBAs) of various commands being mapped to chunks identifiers (IDs) and then to stream IDs for use with the SSD of FIG. 1.

FIG. 5 shows the logical block addresses (LBAs) of various commands being mapped to chunks identifiers (IDs) and then to stream IDs for use with the SSD of FIG. 1. In FIG. 5, write commands 505-1, 505-2, and 505-3 are shown, although embodiments of the inventive concept may support any number of write commands. In addition, while FIG. 5 only shows write commands, embodiments of the inventive concept may also apply to read commands as well. Write commands 505-1 through 505-3 may include LBAs 510-1 through 510-3, specifying the starting LBA for write commands 505-1 through 505-3.

LBA mapper 410 may access LBAs 510-1 through 510-3 from write commands 505-1 through 505-3. Once LBAs 510-1 through 510-3 have been read from write commands 505-1 through 505-3, LBA mapper 410 may determine corresponding chunk IDs 515-1 through 515-3. Chunks may be thought of as logical subdivisions of SSD 120 (but without requiring chunks to align with other logical subdivisions of SSD 120, such as blocks and pages). The number of chunks may be determined in any desired manner: for example, by picking a desired size for a chunk and dividing the size of SSD 120 by that chunk size, or by selecting a number that has proven to provide adequate utility without requiring too much processing to be performed by background logic 435 of FIG. 4 (and dividing SSD 120 into that many chunks). Chunks do not have to have the same size, although uniformity of size may simplify the operations of LBA mapper 410. Thus, for example, one chunk might include 128 KB of data in SSD 120, whereas another chunk might include 512 KB of data in SSD 120. Chunk sizes that are powers of two are particularly advantageous, since determining a chunk from an LBA may be performed using shift operations, but embodiments of the inventive concept may support chunks of any desired size.

LBA mapper 410 may determine chunk IDs 515-1 through 515-3 in any number of ways. For example, LBA mapper 410 may include arithmetic logic unit (ALU) 520 to compute chunk IDs 515-1 through 515-3 mathematically from LBAs 510-1 through 510-3. Or, LBA mapper 410 may include address mask 525, which may mask out various bits from LBAs 510-1 through 510-3, leaving chunk IDs 515-1 through 515-3.

Once chunk IDs 515-1 through 515-3 have been determined, stream selection logic 415 may determine the stream to be used for that chunk. Stream selection logic may use chunk IDs 515-1 through 515-3 to determine corresponding stream IDs 530-1 through 530-3 from chunk-to-stream mapper 340.

Figure 6:
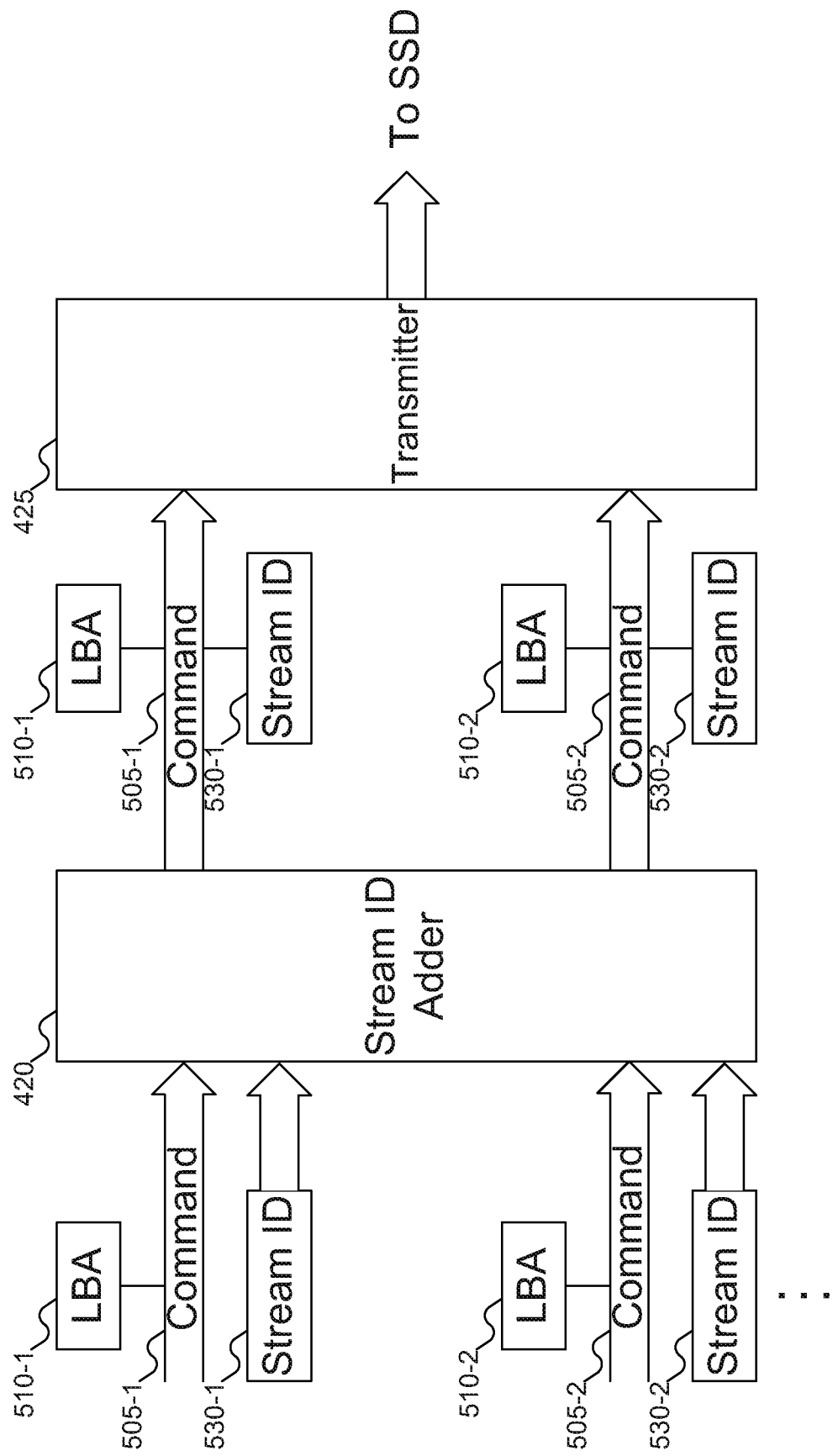
FIG. 6 shows the various commands of FIG. 5 being modified to include the stream IDs of FIG. 5 and transmitted to the SSD of FIG. 1.

FIG. 6 shows commands 505-1 and 505-2 of FIG. 5 being modified to include stream IDs 530-1 and 530-2 of FIG. 5 and transmitted to SSD 120 of FIG. 1. (For space reasons, FIG. 6 shows only two of the three write commands and associated data from FIG. 5. But FIG. 6 generalizes in the same manner as FIG. 5.) In FIG. 6, stream ID adder 420 may write stream ID 530-1 and 530-2 into write commands 505-1 and 505-2. In that manner, SSD 120 of FIG. 1 may know which device stream to use in processing write commands

505-1 and 505-2. Transmitter 425 may transmit modified write commands 505-1 and 505-2 to SSD 120 of FIG. 1.

Not shown in FIGS. 5-6 is the operation of queuer 430 of FIG. 4. Once chunk IDs 515-1 through 515-3 of FIG. 5 have been determined, queuer 430 of FIG. 4 may queue chunk IDs 515-1 through 515-3 of FIG. 5 in submission queue 335 of FIG. 3 for later processing with background logic 435 of FIG. 4. Queuer 430 of FIG. 4 may queue chunk IDs 515-1 through 515-3 of FIG. 5 at any time after chunk IDs 515-1 through 515-3 of FIG. 5 have been determined. For example, queuer 430 of FIG. 4 may queue chunk IDs 515-1 through 515-3 of FIG. 5 after chunk IDs 515-1 through 515-3 of FIG. 5 have been determined by LBA mapper 410 of FIG. 4, after modified write commands 505-1 through 505-3 have been sent to SSD 120 of FIG. 1 by transmitter 425, or at any time in between.

Figures 7, 8:
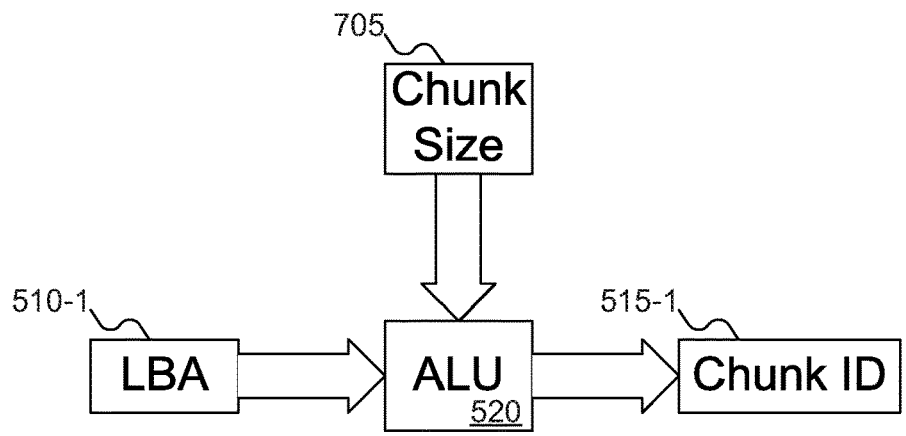
FIG. 7 shows an arithmetic logic unit (ALU) mapping the LBAs of FIG. 5 to the chunk IDs of FIG. 5.
FIG. 8 shows a Sequential, Frequency, Recency (SFR) table that may be used to map chunk IDs to stream IDs, according to a first embodiment of the inventive concept.

FIG. 7 shows arithmetic logic unit (ALU) 520 of FIG. 5 mapping LBA 510-1 of FIG. 5 to chunk ID 515-1 of FIG. 5. In FIG. 7, ALU may receive LBA 510-1 and chunk size 705. By dividing LBA 510-1 by chunk size 705 (and discarding any fractional part of the calculation), chunk ID 515-1 may be calculated.

As described above with reference to FIG. 4, background logic 435 of FIG. 4 may be implemented in varying manners. FIGS. 8-13 describe one embodiment of the inventive concept, and FIGS. 14-20 describe another embodiment of the inventive concept. These embodiments of the inventive concept are not intended to be mutually exclusive: combinations of the two embodiments of the inventive concept are possible. In addition, other embodiments of the inventive concept are also possible, whether or not explicitly described herein.

In the first embodiment of the inventive concept for background logic 435 of FIG. 4, chunk-to-stream mapper 340 of FIG. 3 may include a Sequential, Frequency, Recency (SFR) table. "Sequential, Frequency, Recency" refers to the manner in which the stream ID to be assigned to a chunk may be determined and updated. "Sequential" refers to the situation where one write command is sequential to another write command—that is, the second write command writes data to the next LBA after the earlier write command. Where two write commands are sequential, it makes sense that both commands should be assigned to the same stream ID.

As is described below with reference to FIG. 10, "sequential" in this context should not be read entirely literally, as write commands may issue from any number of different software sources. If two "sequential" write commands from a single software source (for example, a database application) happen to be separated by a write command from some other software source (for example, the file system), the intervening write command should not obviate the sequentiality of the two write commands from the database application. In fact, mechanisms are provided herein to avoid preventing intervening write commands from interrupting sequentiality.

"Frequency" refers to how often the chunk has been accessed. The more often a chunk is accessed, the "hotter" the chunk is considered to be (with temperature acting as an analogy for priority: the higher the "temperature" of a chunk, the higher its priority should be). Thus, as a chunk is accessed more and more, it should be assigned a higher stream priority.

"Recency" refers to how long it has been since the chunk was last accessed. "Recency" acts as a balance to "Frequency": the longer the span since the chunk was last accessed, the "colder" the chunk is considered to be, and therefore the chunk should be assigned a lower priority. Thus, while "frequency" increases the chunk's associated stream, "recency" decreases the chunk's associated stream. "Sequentiality", "Frequency" and "Recency" are discussed further with reference to FIGS. 10-13 below.

Turning now to the embodiment of the inventive concept shown in FIG. 8, FIG. 8 shows an example SFR table that may be used to map chunk IDs 515-1 through 515-3 of FIG. 5 to stream IDs 530-1 through 530-3 of FIG. 5, according to this embodiment of the inventive concept. In FIG. 8, SFR table 805 may store various data. For example, SFR table 805 may store various chunk IDs 515-1 through 515-4, and for each chunk ID 515-1 through 515-4, SFR corresponding stream IDs 530-1 through 530-4.

In addition to stream IDs 530-1 through 530-4, SFR table 805 may store additional data. For example, for each chunk ID 515-1 through 515-4, SFR table 805 may store current (i.e., most recent) access time 810-1 through 810-4 for that chunk. Current access time 810-1 through 810-4 may be the last access of the chunk of any type (e.g., either reads or writes), or just the time of the most recent write command. SFR table 805 may also store previous access time 815-1 through 815-4, which may represent the time at which the chunk was previously accessed. Finally, SFR table 805 may store access counts 820-1 through 820-4, which may represent the number of accesses of the chunk. As described above, access counts 820-1 through 820-4 may represent the total number of accesses (both reads and writes) of the chunks, or just the write accesses of the chunk.

While FIG. 8 shows one possible embodiment of the inventive concept, other embodiments of the inventive concept may store more or less data than shown in FIG. 8. In addition, data structures other than tables may be used to store the information. Embodiments of the inventive concept are intended to cover all such variations.

Figure 9:
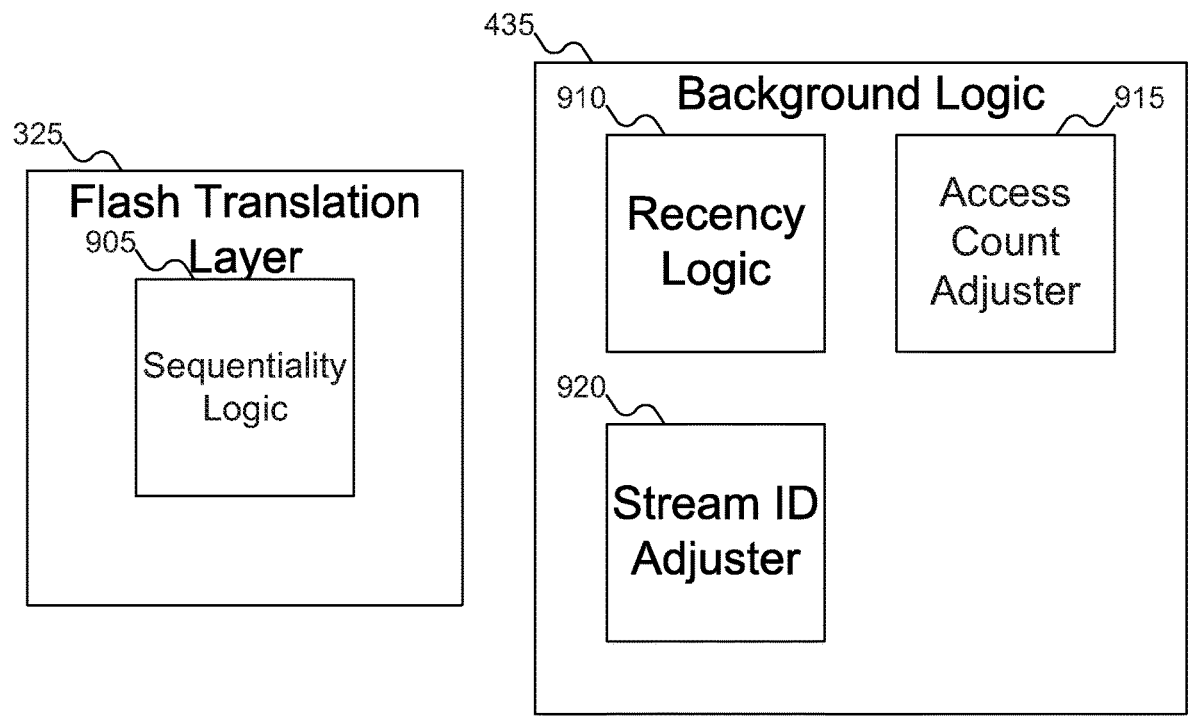
FIG. 9 shows additional details of the flash translation layer of FIG. 3 and the background logic of FIG. 4, according to a first embodiment of the inventive concept.

FIG. 9 shows additional details of flash translation layer 325 of FIG. 3 and background logic 435 of FIG. 4, according to a first embodiment of the inventive concept. In FIG. 9, flash translation layer 325 may also include sequentiality logic 905. Sequentiality logic 905 may determine whether write command 505-1 of FIG. 5 is sequential to some earlier write command for purposes of using the same stream assignment as the earlier write command. Sequentiality logic 905 is discussed further with reference to FIG. 10 below.

Background logic 435 may include recency logic 910, access count adjuster 915, and stream ID adjuster 920. Recency logic 910 may calculate a recency weight for the chunk. Access count adjuster 915 may adjust the access count for the stream based on the recency weight. And stream ID adjuster 920 may calculate a new stream ID to use for the chunk based on the adjusted access count. Recency logic 910, access counter adjuster logic 915, and stream ID adjuster 920 may all be implemented using one (or more) separate or shared ALUs, since they perform arithmetic calculations. Alternatively, recency logic 910, access counter adjuster logic 915, and stream ID adjuster 920 may be implemented using special purpose hardware designed to calculate just the specific functions described and nothing more.

Figure 10:
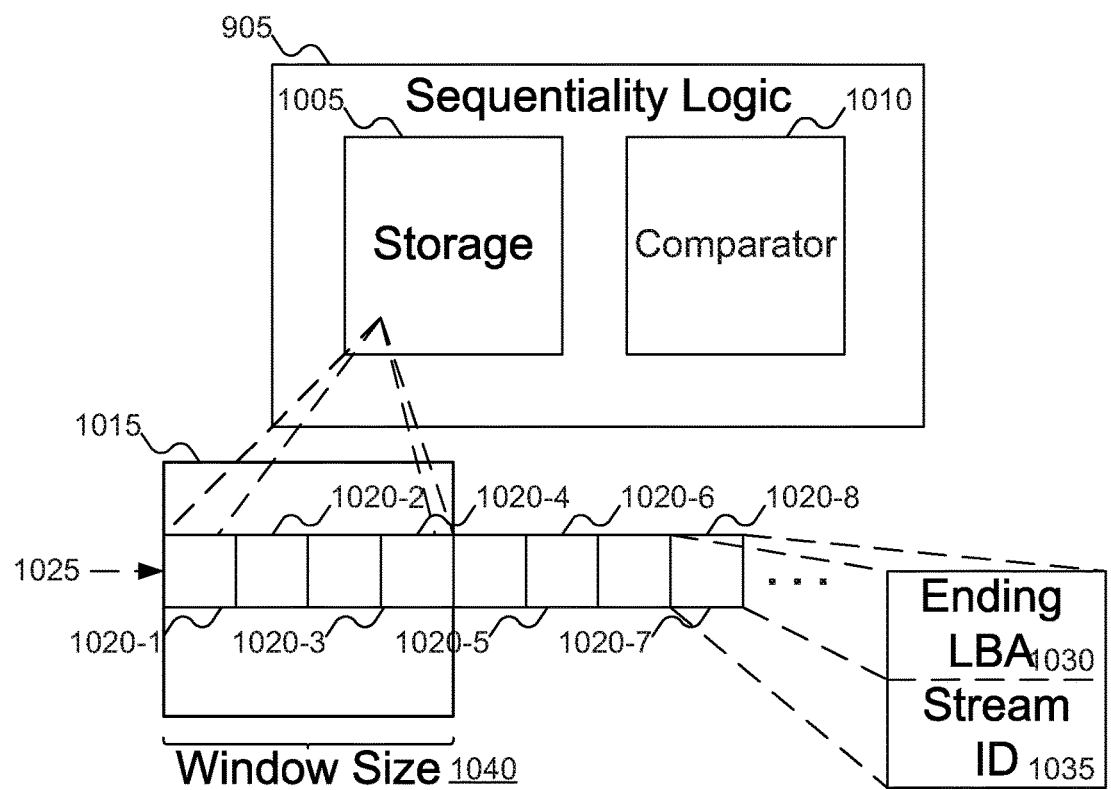
FIG. 10 shows details of the sequentiality logic of FIG. 9.

FIG. 10 shows details of sequentiality logic 905 of FIG. 9. In FIG. 10, sequentiality logic 905 is shown as including storage 1005 and comparator 1010. For practical purposes, storage 1005 may be part of storage 330 of FIG. 3, rather than being a separate storage within sequentiality logic 905. Storage 1005 may store window 1015, which is information about a set of recent write commands, each of which may have a stream ID that was assigned to it. For example, FIG.

10 shows entries 1020-1 through 1020-8, of which entries 1020-1 through 1020-4 are within window 1015. Entries 1020-1 through 1020-8 may be managed in queue 1025. Queue 1025 may take any desired form: for example, an array with a pointer to the head of queue 1025, or a linked list, to name two example implementations. Each entry 1020-1 through 1020-8 may include ending LBA 1030 and stream ID 1035 for an earlier write command. Window 1015 may include window size 1040, which may specify how many recent entries are included in window 1015: in FIG. 10, window size 1040 is shown as including four entries, but embodiments of the inventive concept may support any number of entries in window 1015. Window size 1040 may depend on a number of factors, including, for example, the number of cores in processor 110 of FIG. 1, or the number of software sources (operating system, file system, applications, and the like) running on processor 110 of FIG. 1 that might issue write commands. Embodiments of the inventive concept may support window sizes determined based on other factors as well. In addition, window size 1040 may be either statically set, or may be dynamically changed as conditions within machine 105 of FIG. 1 vary.

When a new write command 505-1 of FIG. 5 is received, comparator 1010 may compare LBA 510-1 of FIG. 5 with ending LBAs 1030 of entries 1020-1 through 1020-4 in window 1015. LBA 510-1 of FIG. 5 may be considered sequential to ending LBA 1030 of an earlier write command if LBA 510-1 of FIG. 5 is the next address after ending LBA 1030 of the earlier write command. Alternatively, LBA 510-1 of FIG. 5 may be considered sequential to ending LBA 1030 of an earlier write command if there is no valid LBA that may be used between ending LBA 1030 of the earlier write command and LBA 510-1 of FIG. 5. (Note that ending LBA 1030 does not need to literally be the last address written to by the earlier write command, provided that there are no possible intervening addresses to which data could have been written.) If LBA 510-1 of FIG. 5 is sequential to ending LBA 1030 of any entry 1020-1 through 1020-4 in window 1015, then stream ID 1035 in the entry 1020-1 through 1020-4 is used for write command 505-1 of FIG. 5.

While identifying sequential LBAs is one way to determine when sequentiality has occurred, embodiments of the inventive concept may support other implementations to detect sequentiality. For example, sequentiality logic 905 may use a pattern matcher to detect when LBAs are accessed for a particular software source in a repeating pattern.

Regardless of whether or not LBA 510-1 of FIG. 5 is sequential to ending LBA 1030 of any entry 1020-1 through 1020-4 in window 1015, the oldest entry in window 1015 may be "ejected" and write command 505-1 of FIG. 5 may be added to window 1015. For example, assume that entry 1020-1 is the entry for the most recent write command in window 1015, and entry 1020-4 is the oldest entry in window 1015. Entry 1020-4 may be removed from window 1015 and LBA 510-1 and stream ID 530-1 both of FIG. 5 may be added to window 1015 as a new entry. Window 1015 may be implemented in any desired manner. For example, window 1015 might include a circular list (such as an array) with a pointer to the oldest entry. When a new entry is to be added to window 1015, the oldest entry, pointed to by the pointer, may be overwritten by the new entry, and the pointer may be adjusted to point to the next oldest entry in window 1015. Embodiments of the inventive concept may support any desired structure to store information about window 1015: a circular list is merely one such possible data structure.

Figure 11:
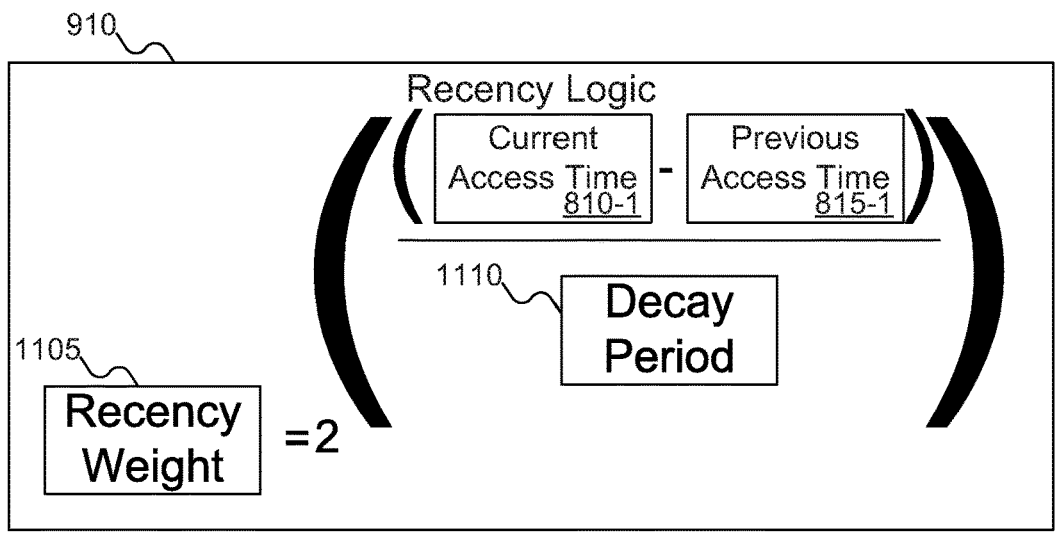
FIG. 11 shows calculating a recency weight using the recency logic of FIG. 9.

FIG. 11 shows calculating a recency weight using recency logic 910 of FIG. 9. In FIG. 11, recency logic 910 is shown as calculating recency weight 1105. The formula shown in FIG. 11 calculates recency weight 1105 as two raised to the power of the difference between current (i.e., most recent) access time 810-1 and previous access time 815-1 for the chunk, divided by decay period 1110. Decay period 1110 represents a tunable variable that may control how quickly chunks are demoted to lower priority streams. Decay period 1110 may be assigned an initial value when machine 105 of FIG. 1 starts, and may be adjusted (either manually by a system administrator or automatically based on system workloads) as desired. It is desirable to prevent chunks from being promoted too quickly (which would result in most chunks using the same high priority stream) or too slowly (which would result in most chunks using the same low priority stream). Put another way, it is desirable to have the chunks assigned to streams in a fairly uniform manner: no individual stream should be too heavily or too lightly utilized. Decay period 1110 represents a way to manage stream promotion and demotion to achieve this objective.

Note that recency weight 1105 may vary for each chunk. Decay period 1110, on the other hand, should be uniform across all calculations for recency weight 1105 (but this does not mean that decay period 1110 may not change over time).

Figure 12:
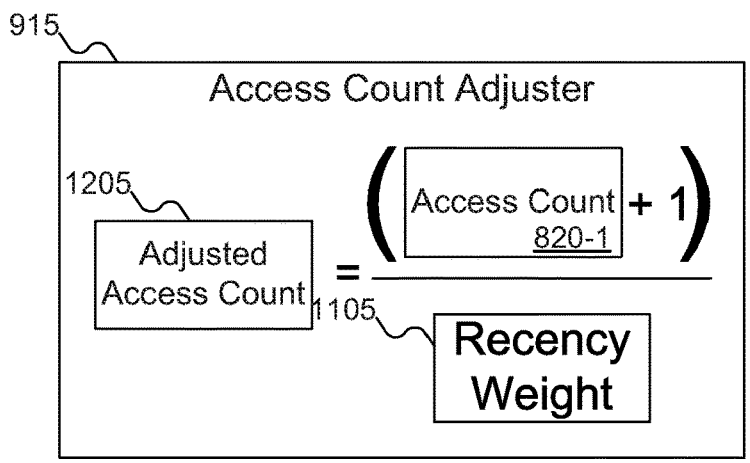
FIG. 12 shows adjusting an access count using the recency weight of FIG. 11 in the access count adjuster of FIG. 9.

FIG. 12 shows adjusting an access count using recency weight 1105 of FIG. 11 in access count adjuster 915 of FIG. 9. In FIG. 12, access count adjuster 915 is shown calculating adjusted access count 1205. Adjusted access count 1205 may be calculated as one more than access count 820-1, divided by recency weight 1105. Adjusted access count 1205 may then be stored back in place of access count 820-1: for example, in SFR table 805 of FIG. 8.

Figure 13:
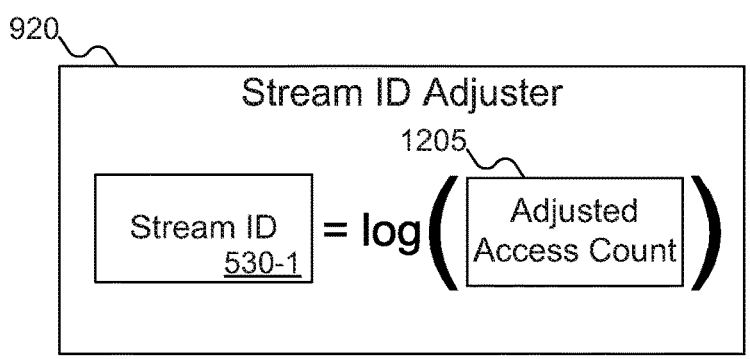
FIG. 13 shows calculating a stream ID from the adjusted access count of FIG. 12 using the stream ID adjuster of FIG. 9.

FIG. 13 shows calculating a stream ID from adjusted access count 1205 of FIG. 12 using stream ID adjuster 920 of FIG. 9. In FIG. 13, stream ID adjuster 920 is shown calculating stream ID 530-1. Stream ID 530-1 may be calculated as the log of the adjusted access count 1205, and may be stored back in place of stream ID 530-1: for example, in SFR table 805 of FIG. 8. While the mathematical term "log", when used in reference to computers, typically means either $\log_2$ or $\log_{10}$, a log function using any desired base may be selected. The chosen base for the log function provides another mechanism by which embodiments of the inventive concept may avoid chunks being promoted too quickly or too slowly (and therefore overuse of one or more device streams and underuse of other device streams). Stream ID adjuster 920 may also use more than one log function, depending on how large adjusted access count 1205 gets. For example, if adjusted access count 1205 is below some threshold, stream ID adjuster 920 may use $\log_2$ to calculate stream ID 530-1, and if adjusted access count 1205 is greater than the threshold, stream ID adjuster 920 may use $\log_{10}$ to calculate stream ID 530-1.

A couple of comments about FIGS. 11-13 are worth making. First, FIGS. 11-13 show specific calculations for computing recency weight 1105 of FIG. 11, adjusted access count 1205 of FIG. 12, and stream ID 530-1. But embodiments of the inventive concept may support calculating these (or other values) in any desired manner. Since the ultimate goal is to be able to adjust stream ID 530-1 of FIG. 8 (either up or down) as appropriate for chunk 515-1 of FIG. 8, any desired approach that achieves such a result may be used. FIGS. 11-13 show merely one such approach.

Second, in FIGS. 11-13, access times (such as current access time 810-1 and previous access time 815-1 of FIG. 11) may be determined based on the number of requests issued, rather than based on a specific clock. For example, assume that write commands 505-1 through 505-3 of FIG. 5 were issued consecutively. Write command 505-1 of FIG. 5 might be the fourth write command, write command 505-2 of FIG. 5 might be the fifth write command, and write command 505-3 of FIG. 5 might be the sixth write command. In this example, the "access times" for the various write commands would be "4", "5", and "6", respectively.

This choice of determining access times has the consequence that if all software sources were to cease sending write commands for some interval of time (such as 1 second, or 1 minute, or 1 hour), the "temperature" of the chunks would not change, even though the chunks have technically not been accessed for a significant amount of time. Thus, even though a chunk might not have been accessed for a significant amount of time, if no other chunk were accessed either during that time, the chunk's "temperature" would not change. From a practical point of view, it is unlikely that all software sources would stop sending write commands at the same time. But if it were to happen, embodiments of the inventive concept would be able to handle the situation. In addition, embodiments of the inventive concept may support using clock time rather than command numbers, which may result in chunks cooling off even though no software sources are issuing write commands.

In contrast to FIGS. 8-13, FIGS. 14-20 show another embodiment of the inventive concept. As with the embodiment of the inventive concept shown in FIGS. 8-13, FIGS. 14-20 may include a data structure to map chunk IDs 515-1 through 515-3 of FIG. 5 to stream IDs 530-1 through 530-3 of FIG. 5 and an implementation of background logic 435 of FIG. 4.

Figure 14:
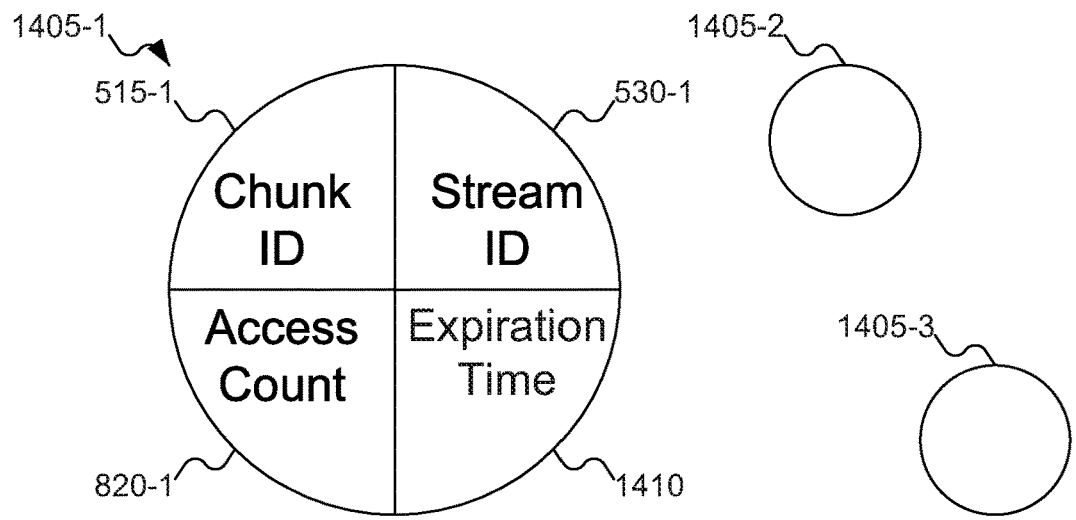
FIG. 14 shows a node that may be used to map chunk IDs to stream IDs, according to a second embodiment of the inventive concept.

FIG. 14 shows a node that may be used to map chunk IDs 515-1 through 515-3 of FIG. 5 to stream IDs 530-1 through 530-3 of FIG. 5, according to a second embodiment of the inventive concept. In FIG. 14, nodes 1405-1 through 1405-3 are shown, with node 1405-1 shown in detail. Nodes 1405-1 through 1405-3 may be stored in any desired manner, such as an array, a linked list, and other data structures. There may be one node for each chunk in SSD 120 of FIG. 1.

Node 1405-1 may include a variety of data, including chunk ID 515-1, stream ID 530-1, access count 820-1, and expiration time 1410. Chunk ID 515-1, stream ID 530-1, and access count 820-1 store data similar to those elements in the first embodiment of the inventive concept. Expiration time 1410 represents the "time" at which the chunk will be considered expired for lack of access by write commands. As with the first embodiment of the inventive concept, "time" may be measured in terms of a particular write command's number in the sequence of all write commands rather than being a measure of a clock.

Figure 15:
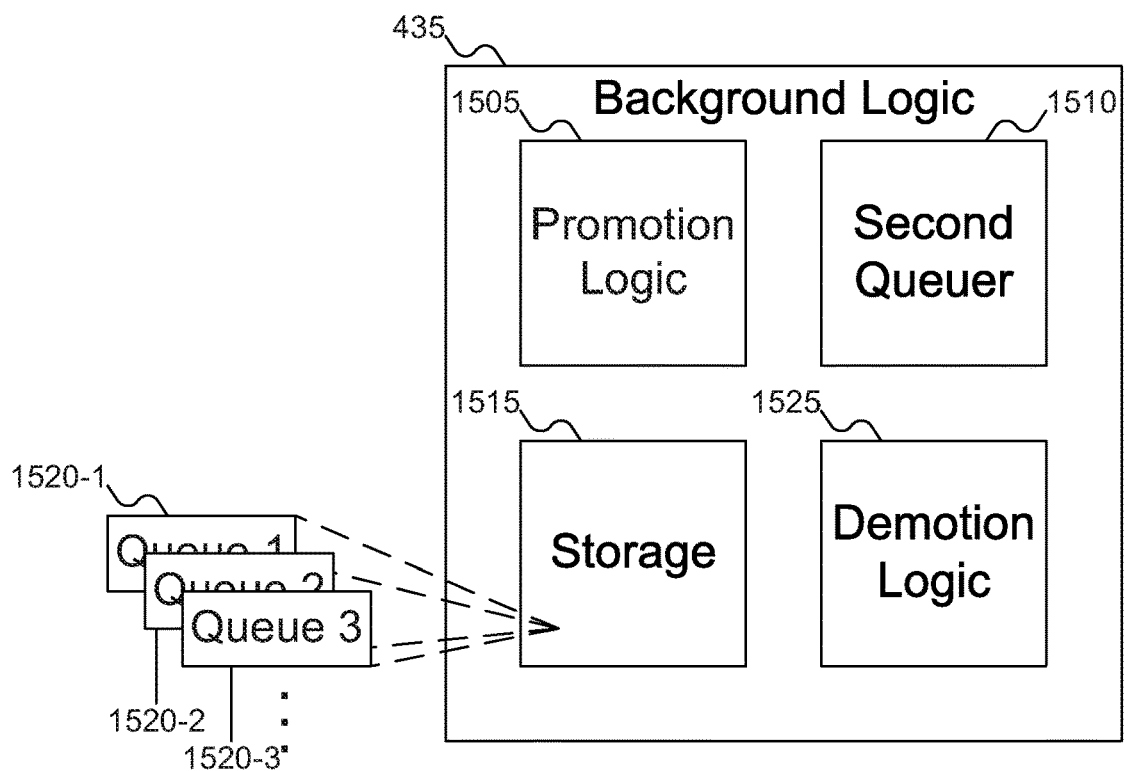
FIG. 15 shows details of the background logic of FIG. 4, according to a second embodiment of the inventive concept.

FIG. 15 shows details of background logic 435 of FIG. 4, according to a second embodiment of the inventive concept. In FIG. 15, background logic 435 may include promotion logic 1505, second queuer 1510, storage 1515 for queues 1520-1 through 1520-3, and demotion logic 1525. Promotion logic 1505 may promote a chunk to a higher priority stream when appropriate. Second queuer 1510 (so named to distinguish it from queuer 430 of FIG. 4, although its operation is similar) may place chunk IDs 515-1 through 515-3 of FIG. 5 in queues 1520-1 through 1520-3. Second queuer may have a structure similar to queuer 430 of FIG. 4. Storage 1515, like storage 1005 of FIG. 10, may effectively be part of storage 330 of FIG. 3, rather than being a separate storage within background logic 435. Embodiments of the inventive concept may support any number of queues: the three queues 1520-1 through 1520-3 are merely an example. In addition, there may be one queue for each stream ID 530-1 through 530-3 of FIG. 5: that the number of queues 1520-1 through 1520-3 is the same as the number of chunk IDs 515-1 through 515-3 of FIG. 3 is coincidental. When chunk IDs 515-1 through 515-3 of FIG. 5 reach the heads of queues 1520-1 through 1520-3, demotion logic 1525 may determine whether to demote chunk IDs 515-1 through 515-3 of FIG. 5.

Figure 16:
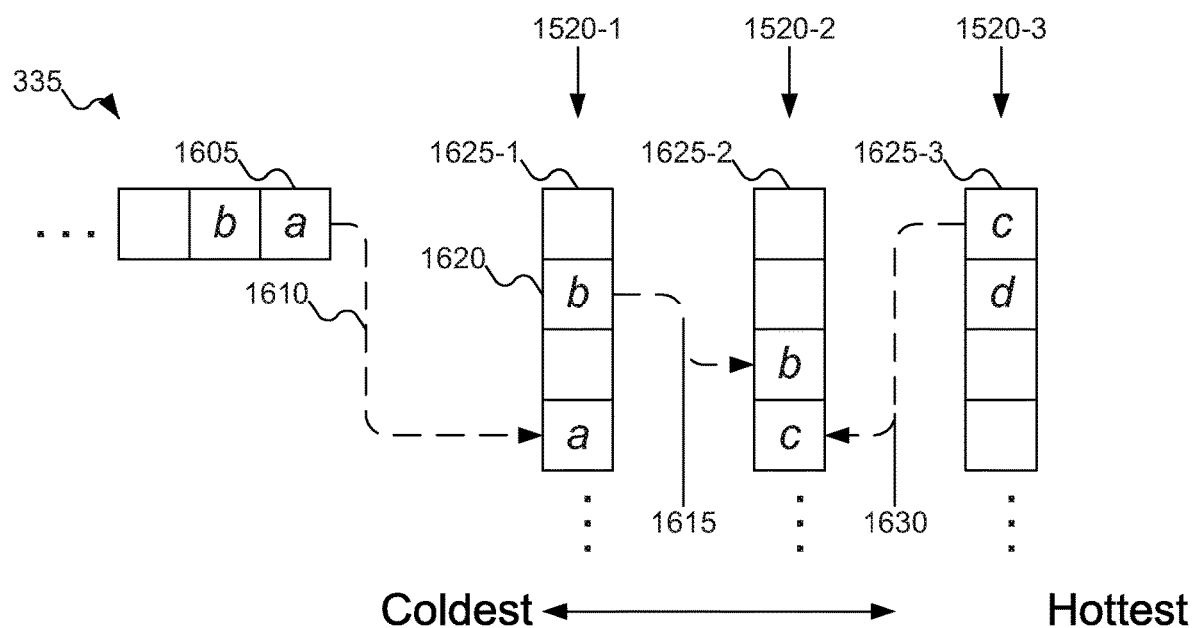
FIG. 16 shows promotion and demotion of chunk IDs in the queues of FIG. 15.

FIG. 16 shows promotion and demotion of chunk IDs in queues 1520-1 through 1520-3 of FIG. 15. In FIG. 16, chunk IDs 515-1 through 515-3 of FIG. 3 are represented using letters a through g. Unlabeled entries in queues 1520-1 through 1520-3 are not used in the example shown in FIG. 16, and may store any chunk ID not otherwise used in the example.

First, in FIG. 16, submission queue 335 is shown with chunk ID a at head 1605 of submission queue 335. Chunk ID a may identify a chunk that has not previously been accessed before. Accordingly, chunk ID a may be added to the tail of queue 1520-1, the queue for the "coldest" stream, as shown by dashed arrow 1610, after which chunk ID a may be removed from submission queue 335.

Second, in FIG. 16, submission queue 335 may include chunk ID b (which may move into head 1605 of submission queue 335 after chunk ID a is processed). As a result of increasing access count 820-1 of FIG. 14 for chunk ID b, chunk ID b may be promoted to a "hotter" stream. As shown by dashed arrow 1615, chunk ID b may be moved from entry 1620 of queue 1520-1 to the tail of queue 1520-2, after which chunk ID b may be removed from submission queue 335.

Third, demotion logic 1525 of FIG. 5 may check heads 1625-1 through 1625-3 of queues 1520-1 through 1520-3 in turn. For example, demotion logic 1525 of FIG. 15 might check chunk ID c at head 1625-3 of queue 1520-3. If chunk ID c is due for demotion, chunk ID c may be moved from head 1625-3 of queue 1520-3 to the tail of queue 1520-2 (the queue for the next "hottest" stream). As a result of chunk ID c being demoted, chunk ID d in queue 1520-3 may become the hottest chunk, as described below with reference to FIG. 17.

Figure 17:
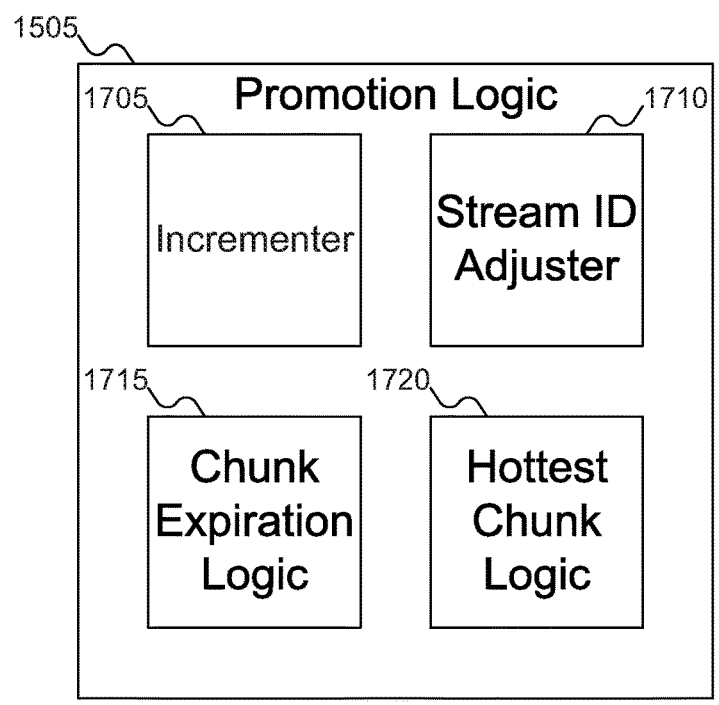
FIG. 17 shows details of the promotion logic of FIG. 15.
Figure 18:
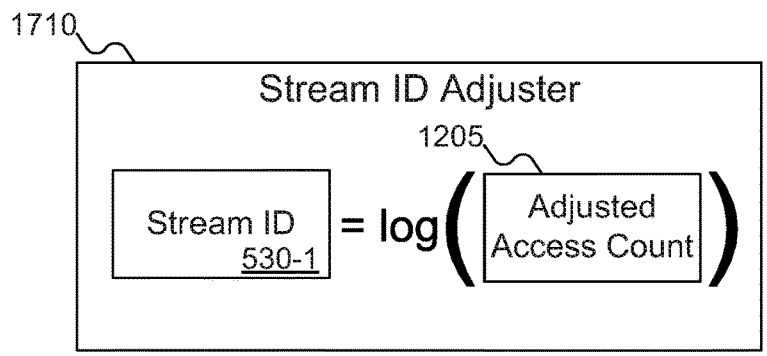
FIG. 18 shows calculating a stream ID from the adjusted access count, according to a second embodiment of the inventive concept.

FIG. 17 shows details of promotion logic 1505 of FIG. 15. In FIG. 17, promotion logic may include incrementer 1705, stream ID adjuster 1710, chunk expiration logic 1715, and hottest chunk logic 1720. Incrementer 1705 may increment access count 820-1 of FIG. 14, producing an adjusted access count. Stream ID adjuster 1710 may calculate stream ID 530-1 of FIG. 5 from the adjusted access count, as shown in FIG. 18. Stream ID adjuster 1710 may be structurally similar to stream ID adjuster 920 of FIG. 9.

Figure 19:
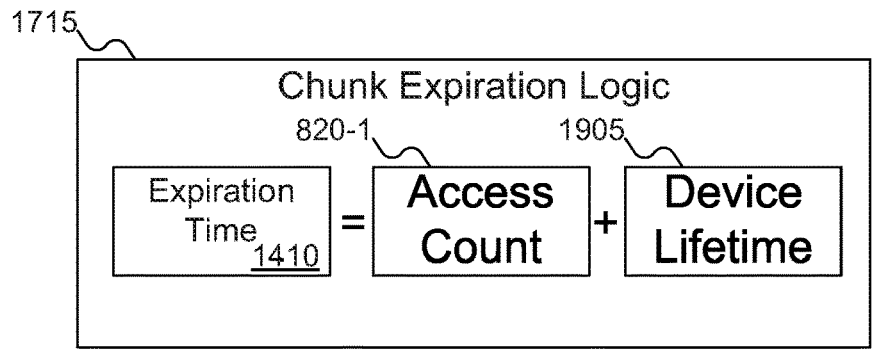
FIG. 19 shows details of the chunk expiration logic of FIG. 17.

Returning to FIG. 17, chunk expiration logic 1715 may determine the expiration time for the chunk. The expiration time for a chunk may be determined as the current access time for the chunk ID, plus the device lifetime. The device lifetime is an interval of time that depends on what chunk is the hottest chunk, which is discussed next. FIG. 19 shows this as an equation: expiration time 1410 is the sum of access count 820-1 (which, as discussed above, may be the current access time for chunk ID 515-1 of FIG. 5) plus device lifetime 1905.

Finally, returning again to FIG. 17, hottest chunk logic 1720 may determine whether chunk ID 515-1 of FIG. 5 now represents the hottest chunk. The hottest chunk may be defined as a chunk ID with the highest stream priority. If there are multiple chunk IDs with the highest stream priority, any selection algorithm may be used to select a particular chunk ID with the highest stream priority as the hottest chunk. For example, the chunk ID at the head of the queue representing the highest stream priority may be selected as the hottest chunk. Or, the chunk ID with the most recent access (i.e., the highest current access time) may be selected as the hottest chunk. Or, the chunk ID at the tail of the queue representing the highest stream priority may be selected as the hottest chunk. If chunk ID 515-1 of FIG. 5 is now the hottest chunk, then device lifetime 1905 of FIG. 19 may be calculated as the difference between the current access time for chunk ID 515-1 of FIG. 5 and the previous access time of chunk ID 515-1 of FIG. 5. Device lifetime 1905 of FIG. 19 may represent the maximum interval expected between two write commands on a particular chunk, and may be defined based on the interval between the most recent two write commands for the hottest chunk. Device lifetime 1905 of FIG. 19 may then be used to determine expiration time 1410 of FIG. 14, which may affect when chunk ID 515-1 of FIG. 14 is demoted.

Figure 20:
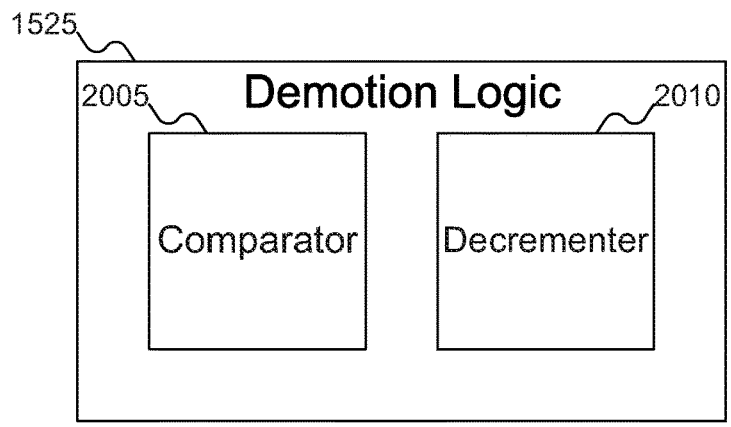
FIG. 20 shows details of the demotion logic of FIG. 15.

FIG. 20 shows details of demotion logic 1525 of FIG. 15. In FIG. 20, demotion logic 1525 is shown as including comparator 2005 and decrementer 2010. Comparator may compare the current time (which, again, may be the number of the most recent write request, rather than a clock time) with expiration time 1410 of FIG. 14. If the current time is past expiration time 1410 of FIG. 14, then the chunk may be considered cooler than before, as it has gone for an interval of time—which may be measured as device lifetime 1905 of FIG. 19—without any write commands. Put another way, if device lifetime 1905 of FIG. 19 represents an expected number of write commands between writes to any given chunk, then expiration time 1410 of FIG. 14—which may be calculated as the most recent access time of chunk ID 515-1 of FIG. 14 plus device lifetime 1905 of FIG. 19—may represent the latest time at which chunk ID 515-1 of FIG. 14 may be written to and not be considered to have cooled off. If expiration time 1410 of FIG. 14 has passed, then chunk ID 515-1 of FIG. 14 has cooled somewhat and may be demoted. In that case, decrementer 2010 may decrement stream ID 530-1 of FIG. 5 to reduce the priority of chunk ID 515-1 of FIG. 5 to correspond with the reduced "temperature" of chunk ID 515-1 of FIG. 5.

If expiration time 1410 of FIG. 14 has not passed, then chunk ID 515-1 of FIG. 14 has not yet cooled off, and chunk ID 515-1 of FIG. 14 may be left at the head of its queue. Note that this does not mean that other chunk IDs in that queue will not be demoted. Because chunk IDs are placed in queues in the order in which the chunks are accessed, chunk ID 515-1 of FIG. 14 is the chunk ID (of those chunk IDs in that queue) that was accessed the longest time ago, and therefore would be the first chunk ID to expire. If chunk ID 515-1 of FIG. 14 is accessed again (and therefore remains hot"), chunk ID 515-1 of FIG. 14 would be moved to the tail of the queue, leaving another chunk ID at the head of the queue and therefore potentially subject to demotion.

Figure 21A:
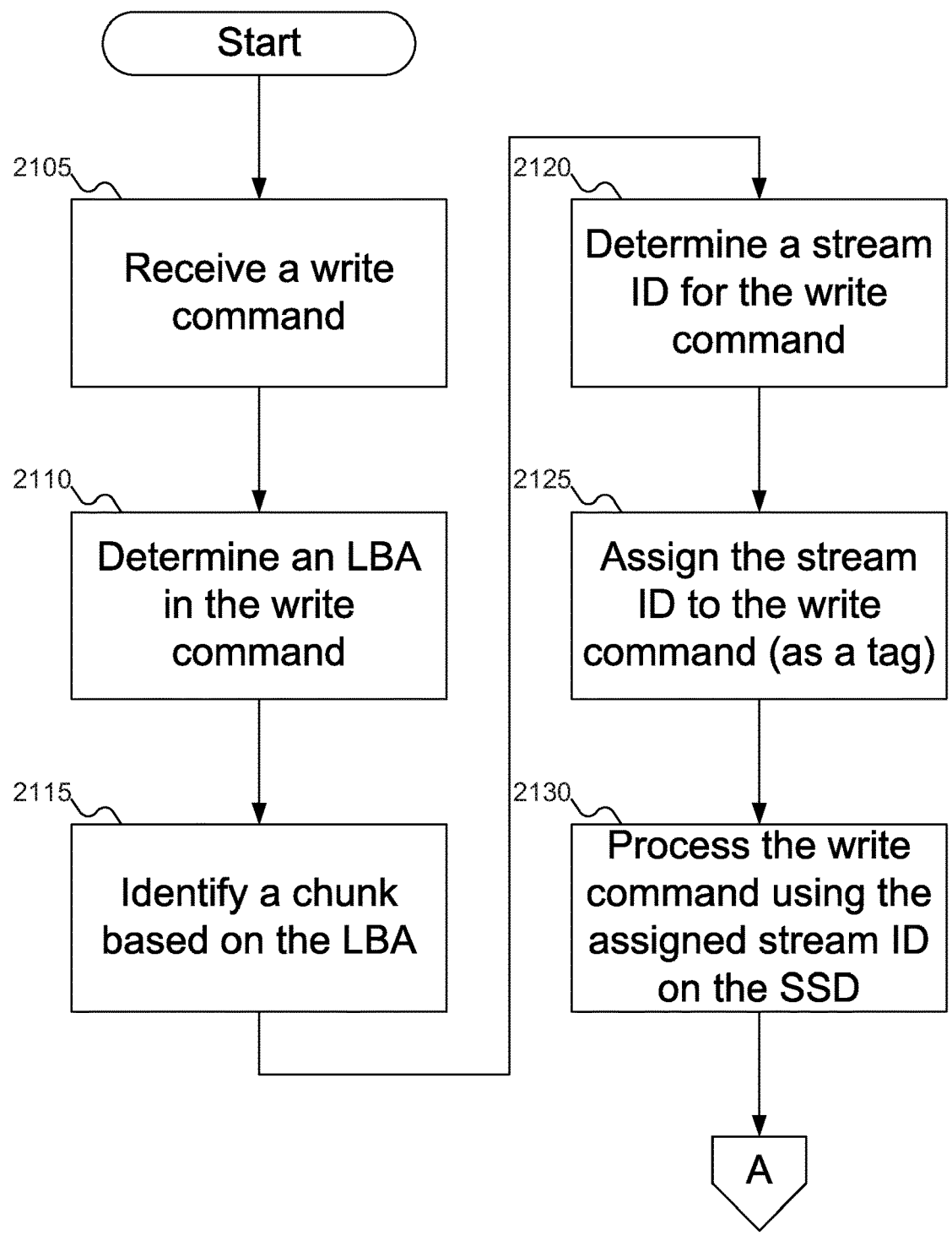
FIGS. 21A-21B show a flowchart of an example procedure for determining a stream ID for a write command of FIG. 5, according to an embodiment of the inventive concept.
Figure 21B:
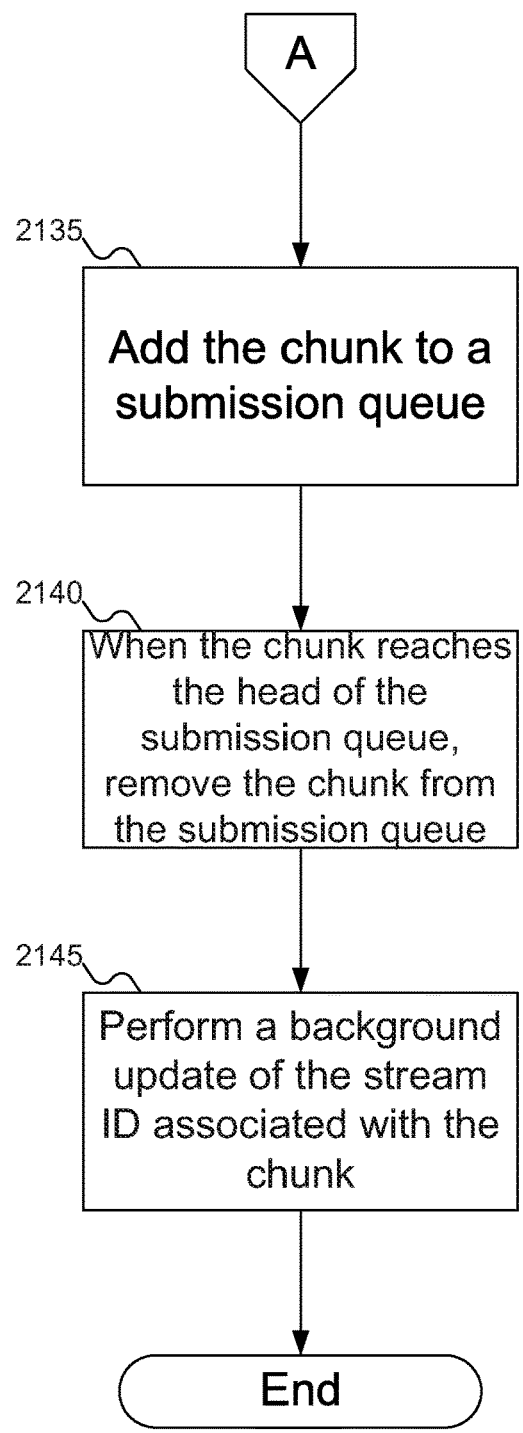

FIGS. 21A-21B show a flowchart of an example procedure for determining stream ID 530-1 of FIG. 5 for write command 505-1 of FIG. 5, according to an embodiment of the inventive concept. In FIG. 21A, at block 2105, receiver 405 of FIG. 4 may receive write command 505-1 from a software source. At block 2110, LBA 510-1 of FIG. 5 may be read from write command 505-1 of FIG. 5. At block 2115, LBA mapper 410 of FIG. 4 may map LBA 510-1 of FIG. 5 to chunk ID 515-1 of FIG. 5. As described above, LBA mapper 410 of FIG. 5 may determine chunk ID 515-1 of FIG. 5 in any desired manner: for example, by masking out certain bits from LBA 510-1 of FIG. 5, or by dividing LBA 510-1 of FIG. 5 by chunk size 705 of FIG. 7. At block 2120, stream selection logic 415 of FIG. 5 may select stream ID 530-1 of FIG. 5 to be used for chunk ID 515-1 of FIG. 5. As described above, stream selection logic 415 of FIG. 5 may operate in any desired manner: for example, by looking up stream ID 530-1 of FIG. 5 from chunk-to-stream mapper 340 of FIG. 3, by calculating stream ID 530-1 of FIG. 5 from access count 820-1 of FIG. 8, by assigning device streams in a round robin fashion, or any other desired approach. At block 2125, stream ID adder 420 of FIG. 4 may add stream ID 530-1 of FIG. 5 to write command 505-1 of FIG. 5. Finally, at block 2130, write command 505-1 of FIG. 5 may be processed by SSD 120 of FIG. 1 to perform the indicated write operation, which may include transmitter 425 of FIG. 4 transmitting write command 505-1 of FIG. 5 to SSD 120 of FIG. 1.

At this point, write command 505-1 of FIG. 5 has been completely processed. But other processing may still be performed, such as to update stream ID 530-1 of FIG. 5 assigned to chunk ID 515-1 of FIG. 5. At block 2135 (FIG. 21A), queuer 430 of FIG. 4 may add chunk ID 515-1 of FIG. 5 to submission queue 335 of FIG. 3 for further processing. At block 2140, when chunk ID 515-1 of FIG. 5 reaches the head of submission queue 335 of FIG. 3, chunk ID 515-1 of FIG. 5 may be removed from submission queue 335 of FIG. 3. Finally, at block 2145, background logic 435 of FIG. 4 may update stream ID 530-1 of FIG. 5 for chunk ID 515-1 of FIG. 5. Various approaches for background logic 435 of FIG. 4 to update stream ID 530-1 of FIG. 5 for chunk ID 515-1 of FIG. 5 are described with reference to FIGS. 24 and 25A-25C below.

Figure 22:
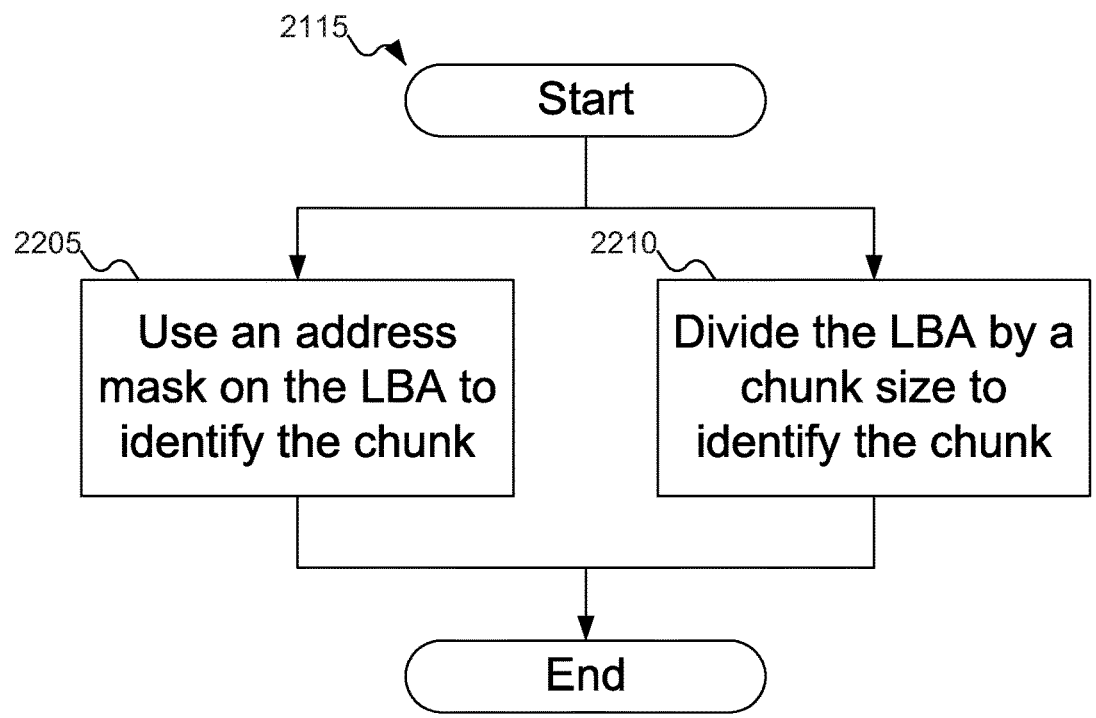
FIG. 22 shows a flowchart of an example procedure for the LBA mapper of FIG. 4 to map the LBAs of FIG. 5 to the chunk IDs of FIG. 5, according to an embodiment of the inventive concept.

FIG. 22 shows a flowchart of an example procedure for LBA mapper 410 of FIG. 4 to map LBA 510-1 of FIG. 5 to chunk ID 515-1 of FIG. 5, according to an embodiment of the inventive concept. In FIG. 22, at block 2205, LBA mapper 410 of FIG. 4 may use address mask 525 of FIG. 5 to mask out bits from LBA 510-1 of FIG. 1, leaving chunk ID 515-1 of FIG. 5. Alternatively, at block 2210, LBA mapper 410 of FIG. 4 may divide LBA 510-1 of FIG. 5 by chunk size 705 of FIG. 7 to determine chunk ID 515-1 of FIG. 5.

Figure 23A:
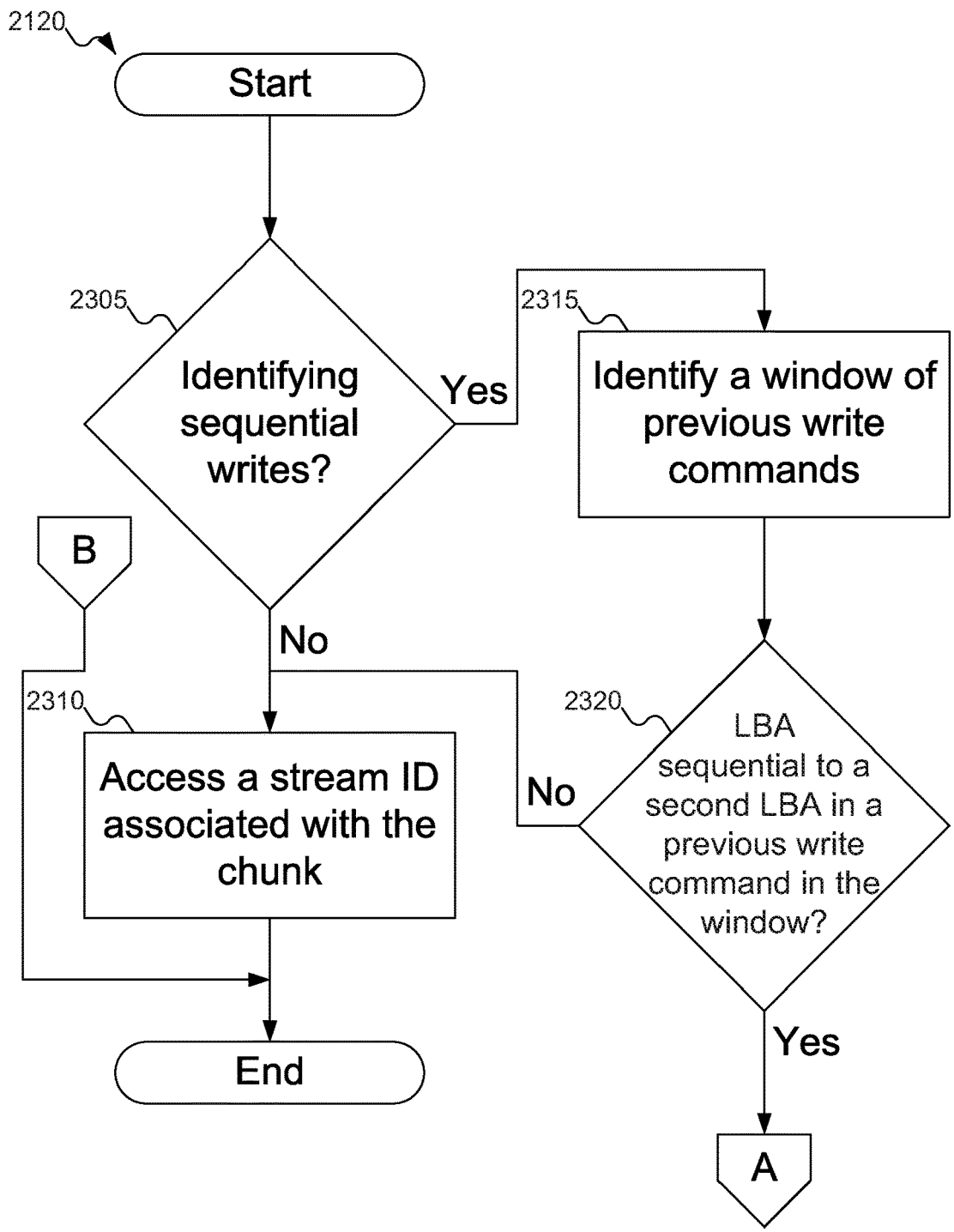
FIGS. 23A-23B show a flowchart of an example procedure for updating a stream ID for a chunk using sequentiality logic, according to a first embodiment of the inventive concept.
Figure 23B:
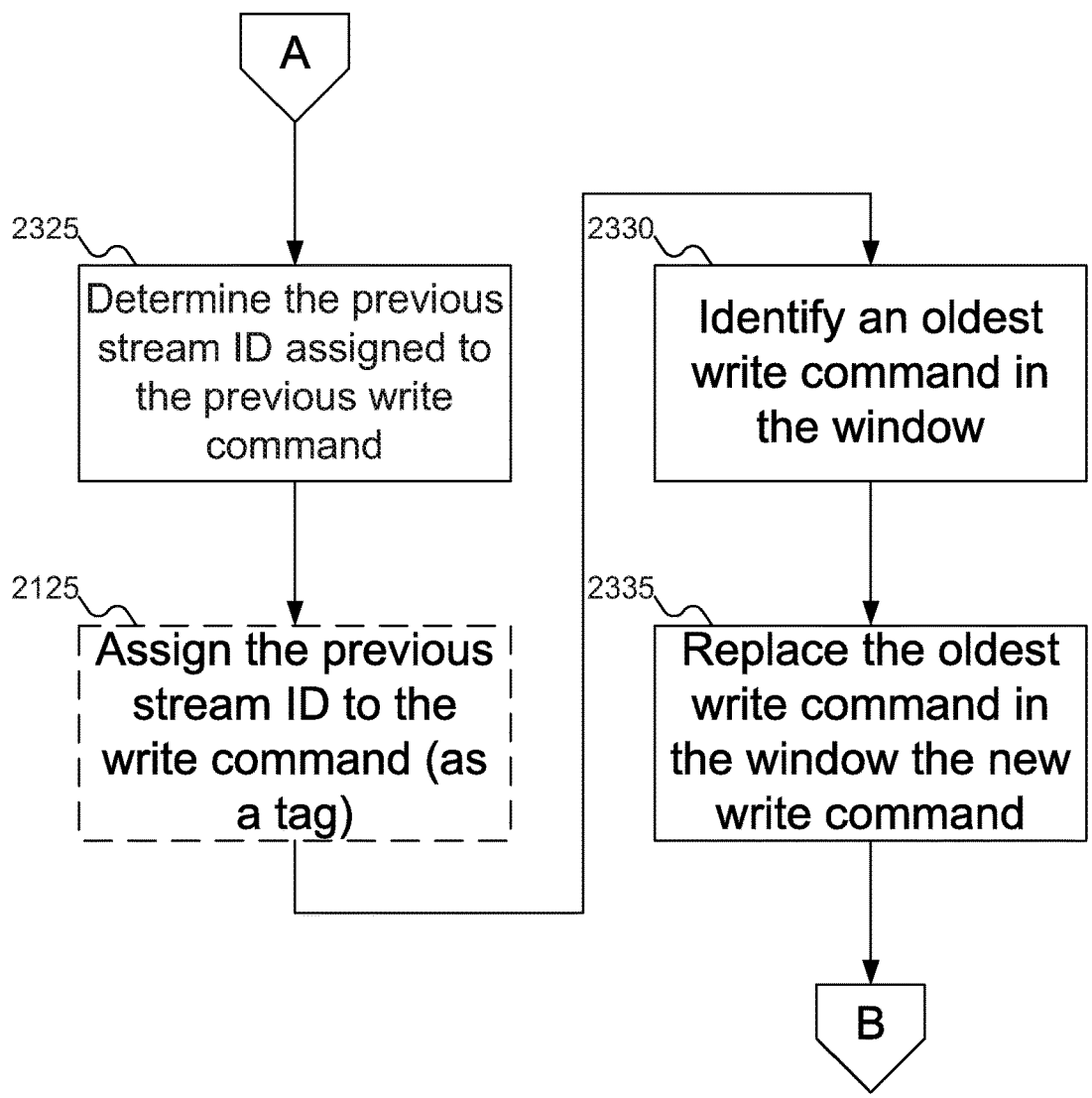

FIGS. 23A-23B show a flowchart of an example procedure for determining stream ID 530-1 of FIG. 5 for chunk ID 515-1 of FIG. 5 using sequentiality logic, according to a first embodiment of the inventive concept. In FIG. 23A, at block 2305, stream selection logic 415 of FIG. 4 may decide whether it is testing for sequential LBAs in write commands 505-1 through 505-3. For example, in embodiments of the inventive concept using the multi-queue approach, stream selection logic 415 of FIG. 4 might not consider whether write command 505-1 of FIG. 5 is sequential to earlier write commands. If stream selection logic 415 of FIG. 4 is not testing for sequential write commands, then at block 2310, stream selection logic 415 of FIG. 4 may determine stream ID 530-1 of FIG. 5 currently associated with chunk ID 515-1 of FIG. 5: for example, by accessing stream ID 530-1 of FIG. 5 from chunk-to-stream mapper 340 of FIG. 3. The specifics of how stream selection logic 415 of FIG. 4 determines stream ID 530-1 of FIG. 5 may depend on how chunk-to-stream mapper 340 of FIG. 3 is implemented: if chunk-to-stream mapper 340 includes SFR table 805 of FIG. 8, then stream selection logic 415 of FIG. 4 may perform a table lookup; if chunk-to-stream mapper 340 includes nodes 1405-1 through 1405-3 of FIG. 14, stream selection logic 415 of FIG. 4 will have to search the nodes to find chunk ID 515-1 of FIG. 5 before determining stream ID 530-1 of FIG. 5.

On the other hand, if stream selection logic 415 of FIG. 4 is testing for sequential write commands, then at block 2315, stream selection logic 415 of FIG. 4 may identify window 1015 of FIG. 10 of entries 1020-1 through 1020-8 of FIG. 10. At block 2320, stream selection logic 415 of FIG. 4 may determine if LBA 510-1 of FIG. 5 is sequential to ending LBA 1030 of FIG. 10 for any entry 1020-1 through 1020-8 of FIG. 10 in window 1015 of FIG. 10. If LBA 515-1 of FIG. 5 is not sequential to ending LBA 1030 of FIG. 10 for any entry 1020-1 through 1020-8 of FIG. 10 in window 1015 of FIG. 10, then at block 2310 stream selection logic 415 of FIG. 4 may determine stream ID 530-1 of FIG. 5 currently associated with chunk ID 515-1 of FIG. 5, as described above.

If stream selection logic 415 of FIG. 4 is testing for sequential write commands and LBA 510-1 of FIG. 5 is sequential to any entry 1020-1 through 1020-8 of FIG. 10 in window 1015 of FIG. 10, then at block 2325 (FIG. 23B) stream selection logic 415 of FIG. 4 may determine stream ID 530-1 of FIG. 5 assigned to the previous write command. At block 2125 (part of FIGS. 21A-21B, and therefore shown in dashed lines in FIG. 23B for illustrative purposes), stream ID 530-1 of FIG. 5 assigned to the previous write command may be assigned to write command 505-1 of FIG. 5. At block 2330, stream selection logic 415 of FIG. 4 may identify entry 1020-1 through 1020-8 of FIG. 10 that is the oldest entry in window 1015 of FIG. 10. Finally, at block 2335, stream selection logic 415 of FIG. 4 may remove the oldest entry in window 1015 of FIG. 5 and add a new entry corresponding to write command 505-1 of FIG. 5. The mechanics of how stream selection logic 415 of FIG. 4 performs this deletion and addition depends on the structure used for window 1015 of FIG. 10. If window 1015 of FIG. 10 stores an array or linked list of entries 1020-1 through 1020-8 of FIG. 10, then deletion and addition may involve little more than overwriting the oldest entry with new values and updating a pointer to the head of the array or linked list. On the other hand, using a different structure for window 1015 of FIG. 10, deletion and addition may involve deleting and deallocating a memory object for the oldest entry and allocating a new memory object for write command 505-1 of FIG. 5.

Figure 24:
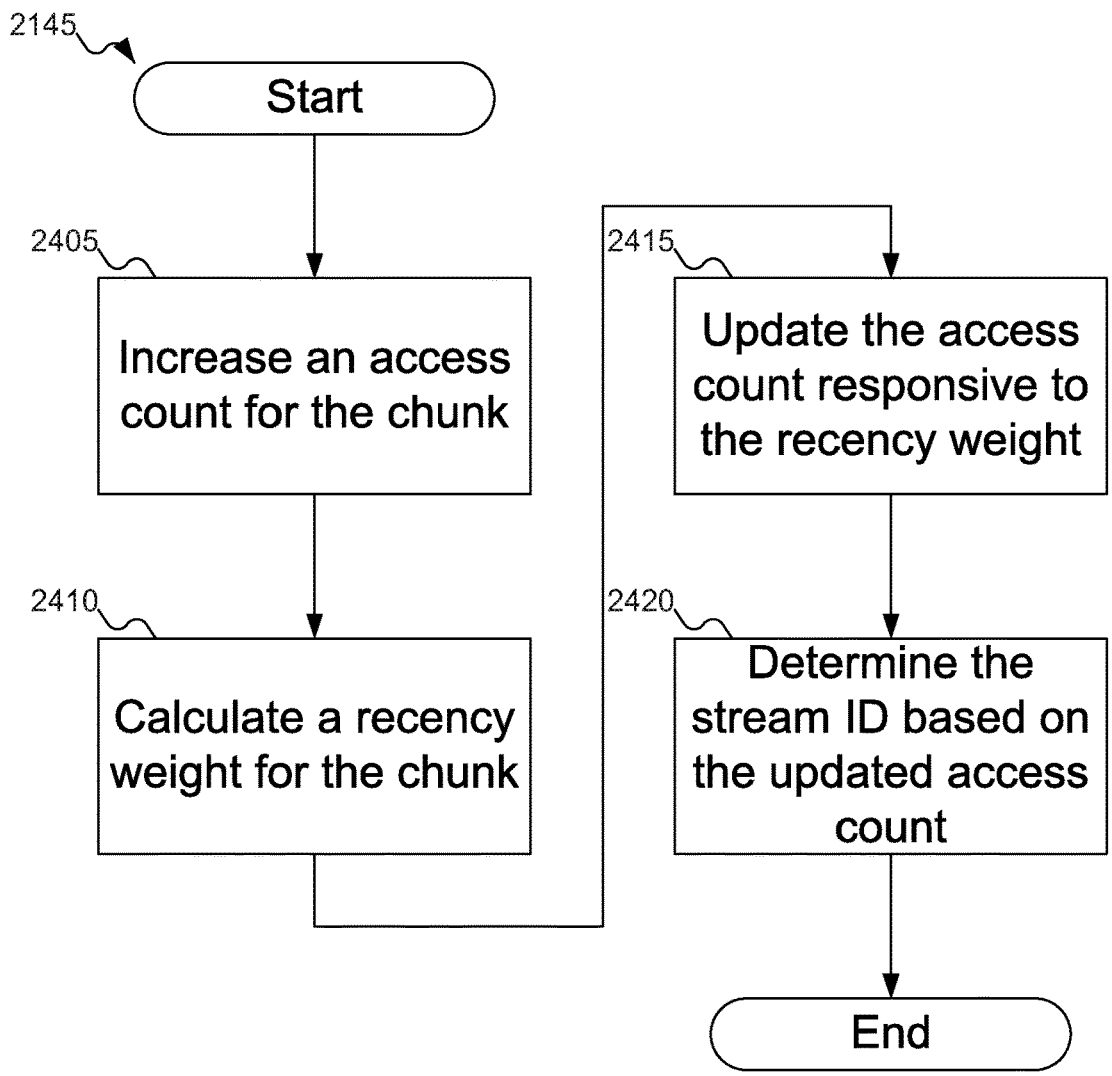
FIG. 24 shows a flowchart of an example procedure for performing a background update of the SFR table of FIG. 8, according to a first embodiment of the inventive concept.

FIG. 24 shows a flowchart of an example procedure for performing a background update of SFR table 805 of FIG. 8, according to a first embodiment of the inventive concept. In FIG. 24, at block 2405, access count adjustment logic 905 of FIG. 9 may increment (for example, using an incrementer or an ALU) access count 820-1 of FIG. 8. At block 2410, recency logic 910 of FIG. 9 may calculate (for example, using an ALU) recency weight 1105 of FIG. 11. At block 2415, access count adjustment logic 905 of FIG. 9 may divide (for example, using an ALU) access count 820-1 of FIG. 8 (as incremented in block 2405) by recency weight 1105 of FIG. 11. Finally, at block 2420, stream ID adjuster 920 of FIG. 9 may determine the new stream ID to associate with chunk ID 515-1 of FIG. 5. For example, stream ID adjuster 920 of FIG. 9 may use an ALU to calculate the log of adjusted access count 1205 of FIG. 12.

Figure 25A:
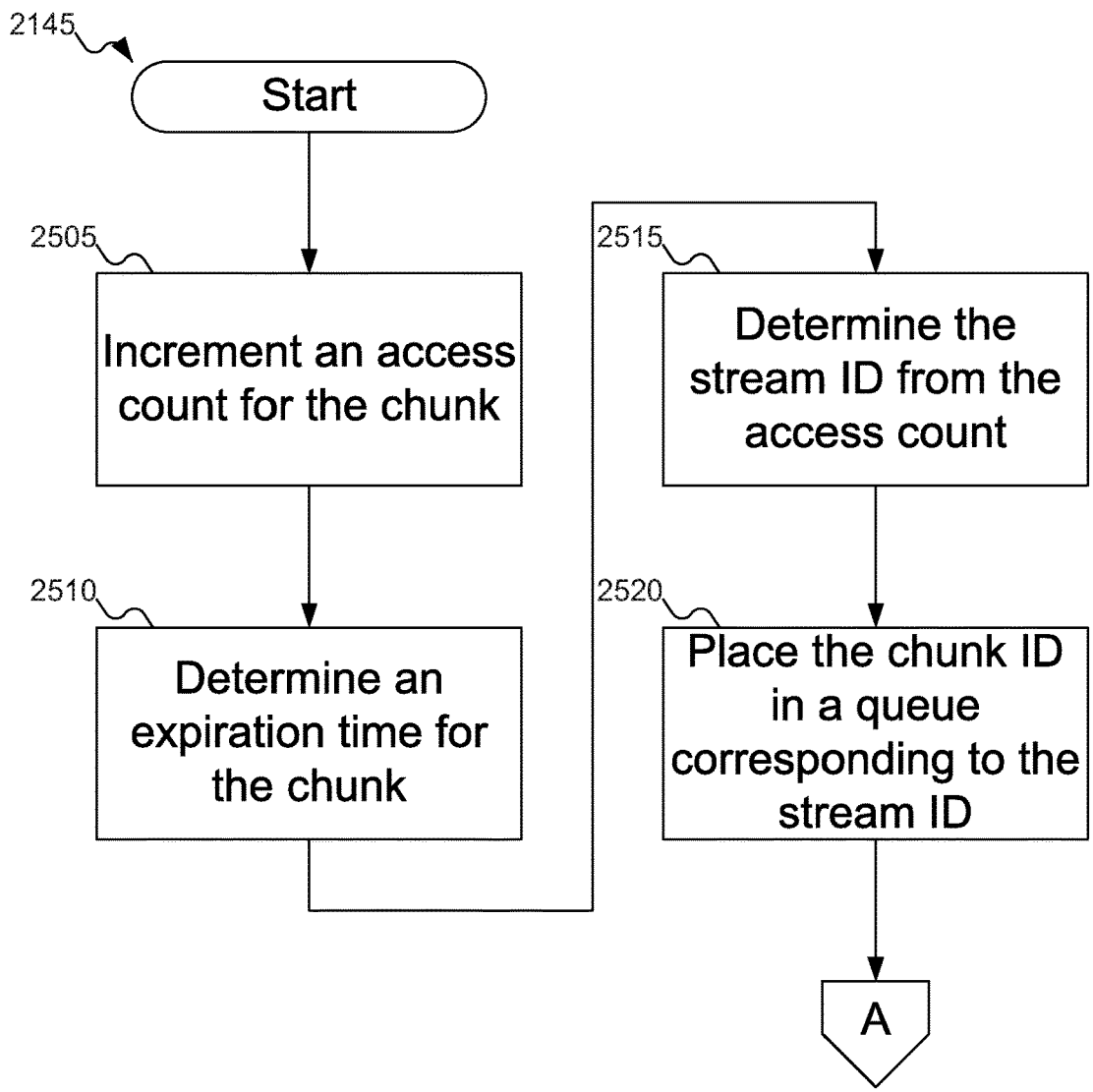
FIGS. 25A-25C show a flowchart of an example procedure for performing a background update of the node of FIG. 14, according to a second embodiment of the inventive concept.
Figure 25B:
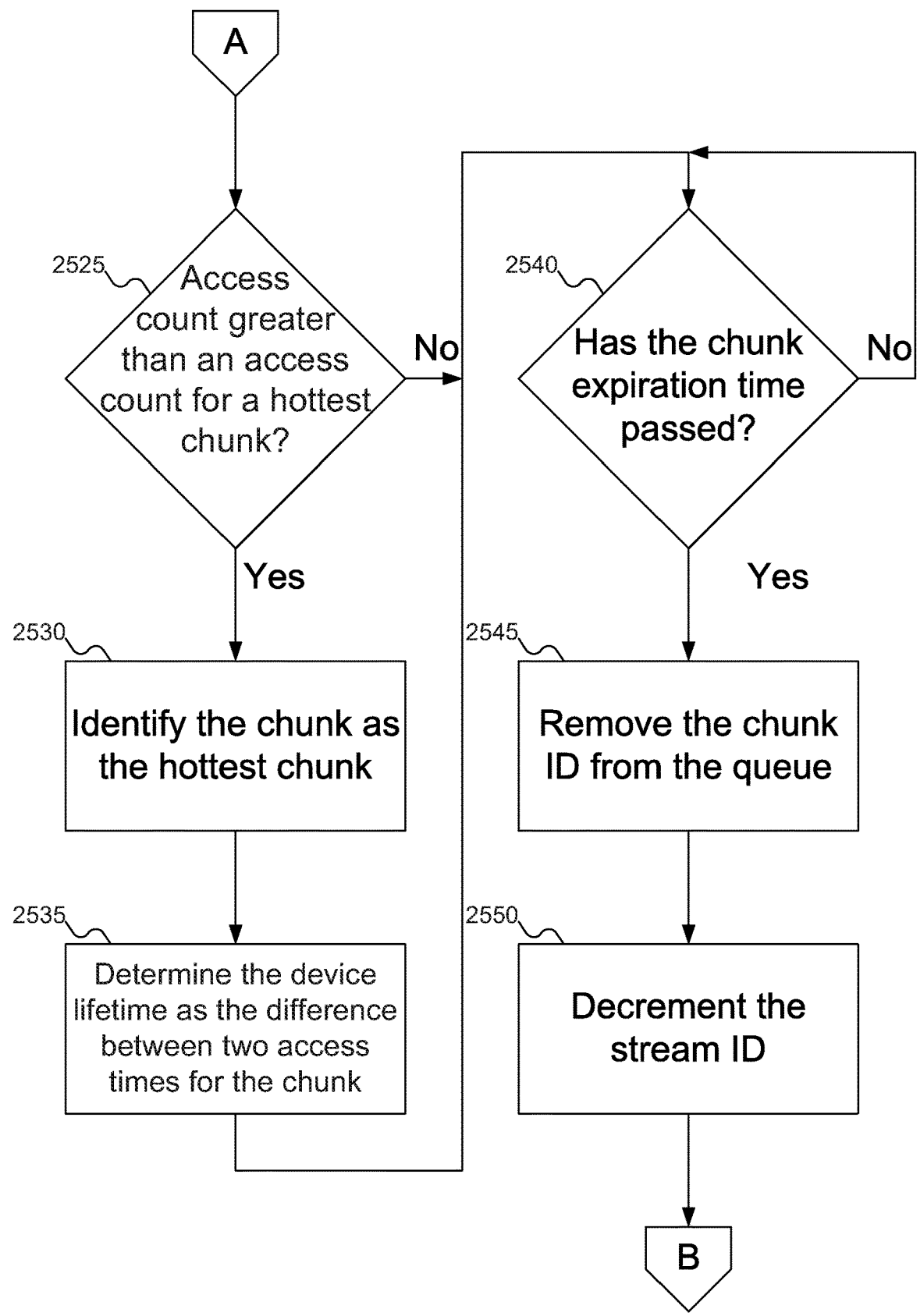
Figure 25C:
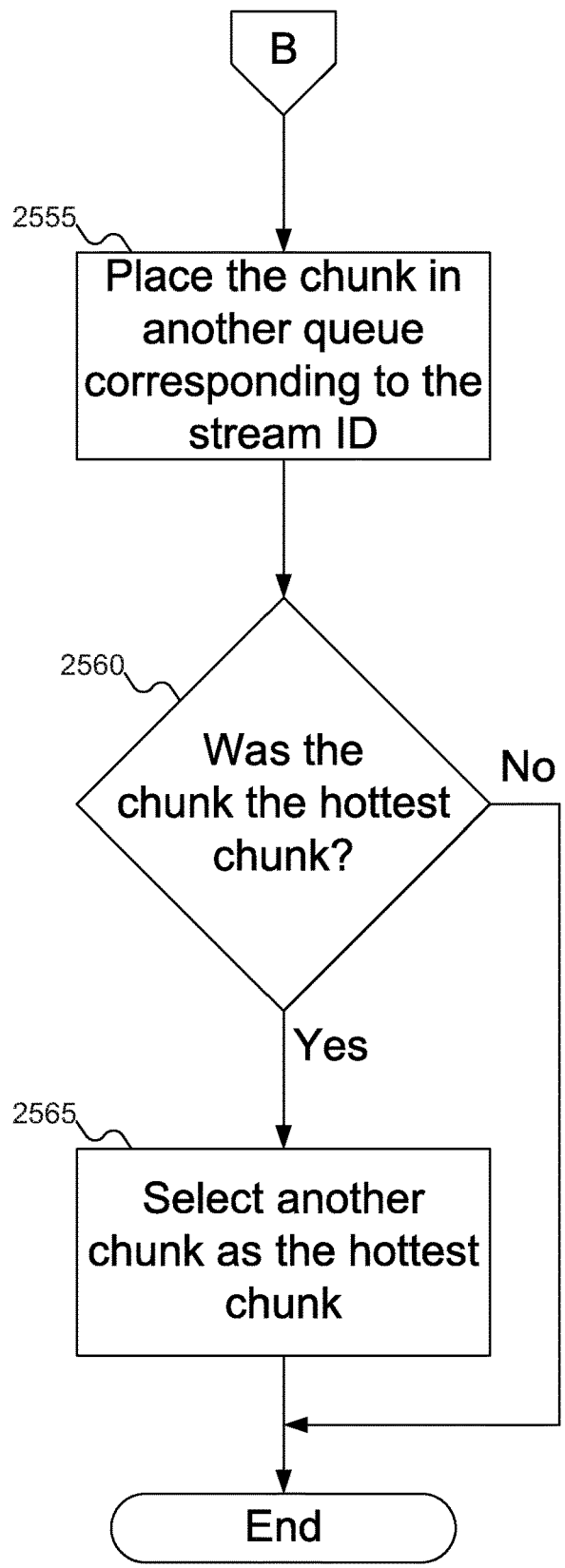

FIGS. 25A-25C show a flowchart of an example procedure for performing a background update of node 1405-1 of FIG. 14, according to a second embodiment of the inventive concept. In FIG. 25A, at block 2505, incrementer 1705 of FIG. 17 may increment access count 820-1 of FIG. 14. At block 2510, chunk expiration logic 1715 of FIG. 17 may determine expiration time 1410 of FIG. 14 for chunk ID 515-1 of FIG. 14. At block 2515, stream ID logic 1710 of FIG. 17 may determine stream ID 530-1 of FIG. 14 for chunk ID 515-1 of FIG. 14. Stream ID logic 1710 of FIG. 17 may determine stream ID 530-1 of FIG. 14 by, for example, accessing stream ID 530-1 of FIG. 14 from node 1405-1 of FIG. 14. At block 2520, second queuer 1510 of FIG. 15 may place chunk ID 515-1 of FIG. 14 in one of queues 1520-1 through 1520-3 of FIG. 15 corresponding to stream ID 530-1 of FIG. 14.

At block 2525 (FIG. 25B), hottest chunk logic 1720 of FIG. 17 may compare access count 820-1 of FIG. 14 for chunk ID 515-1 of FIG. 14 with an access count for the hottest chunk. If access count 820-1 of FIG. 14 for chunk ID 515-1 of FIG. 14 is greater than the access count for the hottest chunk, then chunk ID 515-1 of FIG. 14 is now the hottest chunk. So, at block 2530, hottest chunk logic 1720 of FIG. 17 may identify chunk ID 515-1 of FIG. 14 as the new hottest chunk, and at block 2535, hottest chunk logic 1720 of FIG. 17 may determine device lifetime 1905 of FIG. 19 as the difference in time between the two most recent accesses of chunk ID 515-1 of FIG. 14.

Regardless of whether or not chunk ID 515-1 of FIG. 14 is the hottest chunk, at block 2540, comparator 2005 of FIG. 20 may determine, when chunk ID 515-1 of FIG. 14 is at the head of one of queues 1520-1 through 1520-3 of FIG. 15, whether expiration time 1410 of FIG. 14 has passed. If not, then background logic 435 of FIG. 4 may wait (doing other things in the meantime) and check again at block 2540 until expiration time 1410 of FIG. 14 for chunk ID 515-1 of FIG. 14 has passed. At that point, at block 2545, demotion logic 1525 of FIG. 15 may remove chunk ID 515-1 of FIG. 14 from queues 1520-1 through 1520-3 of FIG. 15. Then, at block 2550, decrementer 2010 of FIG. 20 may decrement stream ID 530-1 of FIG. 14.

At block 2555 (FIG. 25C), second queuer 1510 of FIG. 15 may place chunk ID 515-1 of FIG. 14 in another of queues 1520-1 through 1520-3 of FIG. 15 corresponding to the new string ID. At block 2560, demotion logic 1525 of FIG. 15 may determine whether chunk ID 515-1 of FIG. 14 was the hottest chunk. If so, then at block 2565 demotion logic 1525 of FIG. 15 may select another chunk ID as the new hottest chunk. For example, another chunk assigned to stream ID 530-1 of FIG. 14 (before decrementing in block 2560) may be selected, such as the chunk ID at the head or tail of the queue. Demotion logic 1525 of FIG. 15 may also calculate device lifetime 1905 of FIG. 19 based on the selected new hottest chunk, as before.

In FIGS. 21A-25C, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including harddrives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:
flash memory to store data;
support for a plurality of device streams in the SSD;
a SSD controller to manage writing data to the flash memory responsive to a plurality of write commands, the SSD controller including storage for a submission queue and a chunk-to-stream mapper; and
a flash translation layer, including:
a receiver to receive a write command including a logical block address (LBA);
an LBA mapper to map the LBA to a chunk identifier (ID);
stream selection logic to select a stream ID based on the chunk ID using the chunk-to-stream mapper;
a stream ID adder to add the stream ID to the write command;
a queuer to place the chunk ID in the submission queue; and
background logic to remove the chunk ID from the submission queue and update the chunk-to-stream mapper.

Statement 2. An embodiment of the inventive concept includes a SSD according to statement 1, further comprising a transmitter to transmit the write command with the stream ID to the SSD.

Statement 3. An embodiment of the inventive concept includes a SSD according to statement 1, wherein the LBA mapper includes an address mask to mask a portion of the LBA to determine the chunk ID.

Statement 4. An embodiment of the inventive concept includes a SSD according to statement 1, wherein the LBA mapper includes an arithmetic logic unit (ALU) to divide the LBA by a chunk size to identify the chunk ID.

Statement 5. An embodiment of the inventive concept includes a SSD according to statement 1, wherein the chunk-to-stream mapper includes a Sequential, Frequency, Recency (SFR) table, the SFR table including the chunk ID and the stream ID for the chunk ID.

Statement 6. An embodiment of the inventive concept includes a SSD according to statement 5, wherein the background logic includes sequentiality logic to select a previous stream if the LBA is sequential to a second LBA of a previous write command.

Statement 7. An embodiment of the inventive concept includes a SSD according to statement 6, wherein the previous write command is in a window preceding the write command, the window including a window size.

Statement 8. An embodiment of the inventive concept includes a SSD according to statement 7, wherein the window size is determined responsive to at least one of a number of cores in a processor in a host computer system and a number of software sources running on the processor in the host computer system.

Statement 9. An embodiment of the inventive concept includes a SSD according to statement 7, wherein the SSD controller further includes storage for a queue of previous write commands including the previous write command, the queue including, for each of the previous write commands, an ending LBA and a corresponding stream ID.

Statement 10. An embodiment of the inventive concept includes a SSD according to statement 5, wherein the background logic includes:

recency logic to calculate a recency weight based on a current access time for the chunk ID, a previous access time for the chunk ID, and a decay period;

an access count adjuster to adjust an access count for the chunk ID based on the recency weight producing an adjusted access count; and a stream ID adjuster to adjust the stream ID based on the adjusted access count for the chunk ID.

Statement 11. An embodiment of the inventive concept includes a SSD according to statement 10, wherein the SFR table further includes the current access time for the chunk ID, the previous access time for the chunk ID, and the access count for the chunk ID.

Statement 12. An embodiment of the inventive concept includes a SSD according to statement 10, wherein the recency logic calculates the recency weight as two to the power of (a difference between the current access time for the chunk ID and the previous access time for the chunk ID, divided by the decay period).

Statement 13. An embodiment of the inventive concept includes a SSD according to statement 10, wherein the access count adjuster calculates the adjusted access count for the chunk ID as (the access count for the chunk ID plus one) divided by the recency weight.

Statement 14. An embodiment of the inventive concept includes a SSD according to statement 10, wherein the stream ID adjuster calculates the stream ID as a log of the adjusted access count for the chunk ID.

Statement 15. An embodiment of the inventive concept includes a SSD according to statement 1, wherein the chunk-to-stream mapper includes a node entry, the node entry including the chunk ID and the stream ID for the chunk ID.

Statement 16. An embodiment of the inventive concept includes a SSD according to statement 15, wherein the background logic includes:

promotion logic to determine when to promote the stream ID based on the chunk ID;

a second queuer to place the chunk ID in a first of a plurality of queues corresponding to a plurality of stream IDs, responsive to the stream ID for the chunk ID; and demotion logic to determine when to demote the stream ID based on the chunk ID.

Statement 17. An embodiment of the inventive concept includes a SSD according to statement 16, wherein the promotion logic includes:

an incrementer to increment an access count for the chunk ID; and a stream ID adjuster to determine the stream ID responsive to access count for the chunk ID.

Statement 18. An embodiment of the inventive concept includes a SSD according to statement 17, wherein the stream ID adjuster is operative to determine the stream ID as a log of the access count for the chunk ID.

Statement 19. An embodiment of the inventive concept includes a SSD according to statement 17, wherein the promotion logic further includes chunk expiration logic to compute an expiration time for the chunk ID.

Statement 20. An embodiment of the inventive concept includes a SSD according to statement 19, wherein the chunk expiration logic is operative to compute the expiration time for the chunk ID as a sum of the access count for the chunk ID and a device lifetime.

Statement 21. An embodiment of the inventive concept includes a SSD according to statement 20, wherein the device lifetime is a difference between a last access time for a hottest chunk and a previous access time for the hottest chunk.

Statement 22. An embodiment of the inventive concept includes a SSD according to statement 21, wherein the promotion logic further includes hottest chunk logic to identify the chunk ID as the hottest chunk if the access time for the chunk ID is greater than the last access time for the hottest chunk.

Statement 23. An embodiment of the inventive concept includes a SSD according to statement 21, wherein the node entry further includes the access count for the chunk ID and the expiration time for the chunk ID.

Statement 24. An embodiment of the inventive concept includes a SSD according to statement 16, wherein:

the demotion logic includes:
  a comparator to determine if an expiration time for the chunk ID has passed; and
  if the expiration time for the chunk ID has passed, a decrementor to decrement the stream ID; and
the second queuer is operative to place the chunk ID in a second of the plurality of queues corresponding to the plurality of stream IDs, responsive to the decremented stream ID for the chunk ID.

Statement 25. An embodiment of the inventive concept includes a SSD according to statement 24, wherein the demotion logic is operative to determine when to demote the stream ID based on the chunk ID when the chunk ID is at a head of the first of the plurality of queues.

Statement 26. An embodiment of the inventive concept includes a SSD according to statement 24, wherein the demotion logic is operative to determine when to demote the stream ID based on the chunk ID if the chunk ID is at a head of the first of the plurality of queues.

Statement 27. An embodiment of the inventive concept includes a driver for use in a computer system, comprising:

a receiver to receive a write command for a Solid State Drive (SSD), the write command including a logical block address (LBA);

an LBA mapper to map the LBA to a chunk identifier (ID);

stream selection logic to select a stream ID based on the chunk ID using a chunk-to-stream mapper stored in a memory in a host computer system;

a stream ID adder to add the stream ID to the write command;

a queuer to place the chunk ID in a submission queue stored in the memory; and background logic to remove the chunk ID from the submission queue and update the chunk-to-stream mapper.

Statement 28. An embodiment of the inventive concept includes a driver according to statement 27, further comprising a transmitter to transmit the write command with the stream ID to the SSD.

Statement 29. An embodiment of the inventive concept includes a driver according to statement 27, wherein the LBA mapper includes an address mask to mask a portion of the LBA to identify the chunk.

Statement 30. An embodiment of the inventive concept includes a driver according to statement 27, wherein the LBA mapper includes an arithmetic logic unit (ALU) to divide the LBA by a chunk size to identify the chunk.

Statement 31. An embodiment of the inventive concept includes a driver according to statement 27, wherein the chunk-to-stream mapper includes a Sequential, Frequency, Recency (SFR) table, the SFR table including the chunk ID and the stream ID for the chunk ID.

Statement 32. An embodiment of the inventive concept includes a driver according to statement 31, wherein the background logic includes sequentiality logic to select a previous stream if the LBA is sequential to a second LBA of a previous write command.

Statement 33. An embodiment of the inventive concept includes a driver according to statement 32, wherein the previous write command is in a window preceding the write command, the window including a window size.

Statement 34. An embodiment of the inventive concept includes a driver according to statement 33, wherein the window size is determined responsive to at least one of a number of cores in a processor in the host computer system and a number of software sources running on the processor in the host computer system.

Statement 35. An embodiment of the inventive concept includes a driver according to statement 31, wherein the background logic includes:

recency logic to calculate a recency weight based on a current access time for the chunk ID, a previous access time for the chunk ID, and a decay period;

an access count adjuster to adjust an access count for the chunk ID based on the recency weight producing an adjusted access count; and a stream ID adjuster to adjust the stream ID based on the adjusted access count for the chunk ID.

Statement 36. An embodiment of the inventive concept includes a driver according to statement 35, wherein the SFR table further includes the current access time for the chunk ID, the previous access time for the chunk ID, and the access count for the chunk ID.

Statement 37. An embodiment of the inventive concept includes a driver according to statement 35, wherein the recency logic calculates the recency weight as two to the power of (a difference between the current access time for the chunk ID and the previous access time for the chunk ID, divided by the decay period).

Statement 38. An embodiment of the inventive concept includes a driver according to statement 35, wherein the access count adjuster calculates the adjusted access count for the chunk ID as (the access count for the chunk ID plus one) divided by the recency weight.

Statement 39. An embodiment of the inventive concept includes a driver according to statement 35, wherein the stream ID adjuster calculates the stream ID as a log of the adjusted access count for the chunk ID.

Statement 40. An embodiment of the inventive concept includes a driver according to statement 27, wherein the chunk-to-stream mapper includes a node entry, the node entry including the chunk ID and the stream ID for the chunk ID.

Statement 41. An embodiment of the inventive concept includes a driver according to statement 40, wherein the background logic includes:

promotion logic to determine when to promote the stream ID based on the chunk ID;

a second queuer to place the chunk ID in a first of a plurality of queues corresponding to a plurality of stream IDs responsive to the stream ID for the chunk ID; and demotion logic to determine when to demote the stream ID based on the chunk ID.

Statement 42. An embodiment of the inventive concept includes a driver according to statement 41, wherein the promotion logic includes:

an incrementer to increment an access count for the chunk ID; and stream ID adjuster to determine the stream ID responsive to access count for the chunk ID.

Statement 43. An embodiment of the inventive concept includes a driver according to statement 42, wherein the stream ID adjuster is operative to determine the stream ID as a log of the access count for the chunk ID.

Statement 44. An embodiment of the inventive concept includes a driver according to statement 42, wherein the promotion logic further includes chunk expiration logic to compute an expiration time for the chunk ID.

Statement 45. An embodiment of the inventive concept includes a driver according to statement 44, wherein the chunk expiration logic is operative to compute the expiration time for the chunk ID as a sum of the access count for the chunk ID and a device lifetime.

Statement 46. An embodiment of the inventive concept includes a driver according to statement 45, wherein the device lifetime is a difference between a last access time for a hottest chunk and a previous access time for the hottest chunk.

Statement 47. An embodiment of the inventive concept includes a driver according to statement 46, wherein the promotion logic further includes hottest chunk logic to identify the chunk ID as the hottest chunk if the access time for the chunk ID is greater than the last access time for the hottest chunk.

Statement 48. An embodiment of the inventive concept includes a driver according to statement 46, wherein the node entry further includes the access count for the chunk ID and the expiration time for the chunk ID.

Statement 49. An embodiment of the inventive concept includes a driver according to statement 41, wherein:

the demotion logic includes:

a comparator to determine if an expiration time for the chunk ID has passed; and if the expiration time for the chunk ID has passed, a decrementor to decrement the stream ID; and the second queuer is operative to place the chunk ID in a second of the plurality of queues corresponding to the plurality of stream IDs responsive to the decremented stream ID for the chunk ID.

Statement 50. An embodiment of the inventive concept includes a driver according to statement 49, wherein the demotion logic is operative to determine when to demote the stream ID based on the chunk ID when the chunk ID is at a head of the first of the plurality of queues.

Statement 51. An embodiment of the inventive concept includes a driver according to statement 49, wherein the demotion logic is operative to determine when to demote the stream ID based on the chunk ID if the chunk ID is at a head of the first of the plurality of queues.

Statement 52. An embodiment of the inventive concept includes a method, comprising: receiving a write command from a software source;

determining a logical block address (LBA) in the write command;

identifying a chunk identifier (ID) for a chunk on a Solid State Drive (SSD) including the LBA;

accessing a stream ID associated with the chunk ID;

assigning the stream ID to the write command;

processing the write command using the assigned stream ID on the SSD; and performing a background update of the stream ID associated with the chunk ID.

Statement 53. An embodiment of the inventive concept includes a method according to statement 52, wherein the method is implemented in one of a file system layer, a block layer, or a device driver layer on a host computer system.

Statement 54. An embodiment of the inventive concept includes a method according to statement 52, wherein the method is implemented in a flash translation layer of the SSD.

Statement 55. An embodiment of the inventive concept includes a method according to statement 52, wherein identifying a chunk identifier (ID) for a chunk on a Solid State Drive (SSD) including the LBA includes using an address mask on the LBA to identify the chunk ID.

Statement 56. An embodiment of the inventive concept includes a method according to statement 52, wherein identifying a chunk identifier (ID) for a chunk on a Solid State Drive (SSD) including the LBA includes dividing the LBA by a number of sectors in the chunk.

Statement 57. An embodiment of the inventive concept includes a method according to statement 52, wherein assigning the stream ID to the write command includes adding the stream ID to the write command as a tag.

Statement 58. An embodiment of the inventive concept includes a method according to statement 52, further comprising:
  determining whether the logical block address is sequential to a second LBA in a second write command; and
  if the logical block address is sequential to the second LBA in the second write command:
    determining the second stream ID assigned to the second write command; and
    assigning the second stream ID to the write command.

Statement 59. An embodiment of the inventive concept includes a method according to statement 58, wherein the second write command is in a window preceding the write command.

Statement 60. An embodiment of the inventive concept includes a method according to statement 59, further comprising identifying the window.

Statement 61. An embodiment of the inventive concept includes a method according to statement 60, wherein identifying the window includes identifying a window size for the window responsive to at least one of a number of cores in a processor in a host computer system including the SSD and a number of software sources running on the processor in the host computer system including the SSD.

Statement 62. An embodiment of the inventive concept includes a method according to statement 58, further comprising:
  identifying an oldest write command in the window; and
  replacing the oldest write command in the window with the write command.

Statement 63. An embodiment of the inventive concept includes a method according to statement 52, wherein performing a background update of the stream ID associated with the chunk ID includes:
  adding the chunk ID to a submission queue; and
  removing the chunk ID from the submission queue when the chunk ID is at a head of the submission queue.

Statement 64. An embodiment of the inventive concept includes a method according to statement 52, wherein performing a background update of the stream ID associated with the chunk ID includes:
  increasing an access count for the chunk ID;
  calculating a recency weight for the chunk ID responsive to a current access time and a previous access time for the chunk ID;
  updating the access count for the chunk ID responsive to the recency weight; and
  determining the stream ID for the chunk ID responsive to the updated access count.

Statement 65. An embodiment of the inventive concept includes a method according to statement 64, wherein calculating a recency weight for the chunk ID responsive to a current access time and a previous access time for the chunk ID includes calculating the recency weight as two to the power of (a difference between the current access time and the previous access time for the chunk ID, divided by a decay period).

Statement 66. An embodiment of the inventive concept includes a method according to statement 65, wherein updating the access count for the chunk ID responsive to the recency weight includes dividing the access count by the recency weight.

Statement 67. An embodiment of the inventive concept includes a method according to statement 64, wherein determining the stream ID for the chunk ID responsive to the updated access count includes calculating the stream ID for the chunk ID as a log of the updated access count.

Statement 68. An embodiment of the inventive concept includes a method according to statement 52, wherein performing a background update of the stream ID associated with the chunk ID includes:
  placing the chunk ID in a queue corresponding to the stream ID, where the queue corresponding to the stream ID is one a plurality of queues; and
  determining whether to demote the chunk ID when the chunk ID reaches the head of the queue.

Statement 69. An embodiment of the inventive concept includes a method according to statement 68, wherein placing the chunk ID in a queue corresponding to the stream ID includes:
  incrementing an access count for the chunk ID; and
  determining the stream ID for the chunk ID responsive to the access count for the chunk ID.

Statement 70. An embodiment of the inventive concept includes a method according to statement 69, wherein determining the stream ID for the chunk ID responsive to the access count for the chunk ID includes calculating the stream ID for the chunk ID as a log of the access count for the chunk ID.

Statement 71. An embodiment of the inventive concept includes a method according to statement 69, wherein placing the chunk ID in a queue corresponding to the stream ID further includes, if the access count for the chunk ID exceeds a second access count for a hottest chunk, identifying the chunk ID as a new hottest chunk.

Statement 72. An embodiment of the inventive concept includes a method according to statement 71, wherein identifying the chunk ID as a new hottest chunk includes determining the device lifetime as a difference between a current access time for the chunk ID and a previous access time for the chunk ID.

Statement 73. An embodiment of the inventive concept includes a method according to statement 68, wherein:
  performing a background update of the stream ID associated with the chunk ID further includes determining an expiration time for the chunk ID responsive to the access count and a device lifetime; and
  determining whether to demote the chunk ID when the chunk ID reaches the head of the queue includes, if the expiration time for the chunk ID has passed:
    removing the chunk ID from the queue corresponding to the stream ID;
    decrementing the stream ID; and placing the chunk ID in a second queue corresponding to the decremented stream ID.

Statement 74. An embodiment of the inventive concept includes a method according to statement 73, wherein determining an expiration time for the chunk ID responsive to the access count and a device lifetime includes determining the device lifetime as a difference between a last access time for a hottest chunk and a previous access time for the hottest chunk.

Statement 75. An embodiment of the inventive concept includes a method according to statement 73, wherein determining whether to demote the chunk ID when the chunk ID reaches the head of the queue further includes, if the expiration time for the chunk ID has passed and if the chunk ID is a hottest chunk selecting a second chunk ID in the queue corresponding to the stream ID as a new hottest chunk.

Statement 76. An embodiment of the inventive concept includes an article comprising a non-transitory storage medium, the non-transitory storage medium having stored thereon instructions that, when executed by a machine, result in:
  receiving a write command from a software source;
  determining a logical block address (LBA) in the write command;
  identifying a chunk identifier (ID) for a chunk on a Solid State Drive (SSD) including the LBA;
  accessing a stream ID associated with the chunk ID;
  assigning the stream ID to the write command;
  processing the write command using the assigned stream ID on the SSD; and
  performing a background update of the stream ID associated with the chunk ID.

Statement 77. An embodiment of the inventive concept includes an article according to statement 76, wherein the method is implemented in one of a file system layer, a block layer, or a device driver layer on a host computer system.

Statement 78. An embodiment of the inventive concept includes an article according to statement 76, wherein the method is implemented in a flash translation layer of the SSD.

Statement 79. An embodiment of the inventive concept includes an article according to statement 76, wherein identifying a chunk identifier (ID) for a chunk on a Solid State Drive (SSD) including the LBA includes using an address mask on the LBA to identify the chunk ID.

Statement 80. An embodiment of the inventive concept includes an article according to statement 76, wherein identifying a chunk identifier (ID) for a chunk on a Solid State Drive (SSD) including the LBA includes dividing the LBA by a number of sectors in the chunk.

Statement 81. An embodiment of the inventive concept includes an article according to statement 76, wherein assigning the stream ID to the write command includes adding the stream ID to the write command as a tag.

Statement 82. An embodiment of the inventive concept includes an article according to statement 76, the non-transitory storage medium having stored thereon further instructions that, when executed by the machine, result in:
  determining whether the logical block address is sequential to a second LBA in a second write command; and
  if the logical block address is sequential to the second LBA in the second write command:
    determining the second stream ID assigned to the second write command; and
    assigning the second stream ID to the write command.

Statement 83. An embodiment of the inventive concept includes an article according to statement 82, wherein the second write command is in a window preceding the write command.

Statement 84. An embodiment of the inventive concept includes an article according to statement 83, the non-transitory storage medium having stored thereon further instructions that, when executed by the machine, result in identifying the window.

Statement 85. An embodiment of the inventive concept includes an article according to statement 84, wherein identifying the window includes identifying a window size for the window responsive to at least one of a number of cores in a processor in a host computer system including the SSD and a number of software sources running on the processor in the host computer system including the SSD.

Statement 86. An embodiment of the inventive concept includes an article according to statement 82, the non-transitory storage medium having stored thereon further instructions that, when executed by the machine, result in:
  identifying an oldest write command in the window; and
  replacing the oldest write command in the window with the write command.

Statement 87. An embodiment of the inventive concept includes an article according to statement 76, wherein performing a background update of the stream ID associated with the chunk ID includes:
  adding the chunk ID to a submission queue; and
  removing the chunk ID from the submission queue when the chunk ID is at a head of the submission queue.

Statement 88. An embodiment of the inventive concept includes an article according to statement 76, wherein performing a background update of the stream ID associated with the chunk ID includes:
  increasing an access count for the chunk ID;
  calculating a recency weight for the chunk ID responsive to a current access time and a previous access time for the chunk ID;
  updating the access count for the chunk ID responsive to the recency weight; and
  determining the stream ID for the chunk ID responsive to the updated access count.

Statement 89. An embodiment of the inventive concept includes an article according to statement 88, wherein calculating a recency weight for the chunk ID responsive to a current access time and a previous access time for the chunk ID includes calculating the recency weight as two to the power of (a difference between the current access time and the previous access time for the chunk ID, divided by a decay period).

Statement 90. An embodiment of the inventive concept includes an article according to statement 89, wherein updating the access count for the chunk ID responsive to the recency weight includes dividing the access count by the recency weight.

Statement 91. An embodiment of the inventive concept includes an article according to statement 88, wherein determining the stream ID for the chunk ID responsive to the updated access count includes calculating the stream ID for the chunk ID as a log of the updated access count.

Statement 92. An embodiment of the inventive concept includes an article according to statement 76, wherein performing a background update of the stream ID associated with the chunk ID includes:
  placing the chunk ID in a queue corresponding to the stream ID, where the queue corresponding to the stream ID is one a plurality of queues; and determining whether to demote the chunk ID when the chunk ID reaches the head of the queue.

Statement 93. An embodiment of the inventive concept includes an article according to statement 92, wherein placing the chunk ID in a queue corresponding to the stream ID includes:

incrementing an access count for the chunk ID; and determining the stream ID for the chunk ID responsive to the access count for the chunk ID.

Statement 94. An embodiment of the inventive concept includes an article according to statement 93, wherein determining the stream ID for the chunk ID responsive to the access count for the chunk ID includes calculating the stream ID for the chunk ID as a log of the access count for the chunk ID.

Statement 95. An embodiment of the inventive concept includes an article according to statement 93, wherein placing the chunk ID in a queue corresponding to the stream ID further includes, if the access count for the chunk ID exceeds a second access count for a hottest chunk, identifying the chunk ID as a new hottest chunk.

Statement 96. An embodiment of the inventive concept includes an article according to statement 95, wherein identifying the chunk ID as a new hottest chunk includes determining the device lifetime as a difference between a current access time for the chunk ID and a previous access time for the chunk ID.

Statement 97. An embodiment of the inventive concept includes an article according to statement 92, wherein:

performing a background update of the stream ID associated with the chunk ID further includes determining an expiration time for the chunk ID responsive to the access count and a device lifetime; and determining whether to demote the chunk ID when the chunk ID reaches the head of the queue includes, if the expiration time for the chunk ID has passed:

removing the chunk ID from the queue corresponding to the stream ID;

decrementing the stream ID; and placing the chunk ID in a second queue corresponding to the decremented stream ID.

Statement 98. An embodiment of the inventive concept includes an article according to statement 97, wherein determining an expiration time for the chunk ID responsive to the access count and a device lifetime includes determining the device lifetime as a difference between a last access time for a hottest chunk and a previous access time for the hottest chunk.

Statement 99. An embodiment of the inventive concept includes an article according to statement 97, wherein determining whether to demote the chunk ID when the chunk ID reaches the head of the queue further includes, if the expiration time for the chunk ID has passed and if the chunk ID is a hottest chunk selecting a second chunk ID in the queue corresponding to the stream ID as a new hottest chunk.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:

memory to store data;

a translation table to map a logical address to a physical address in the memory;

a controller to manage writing data to the memory responsive to a write command, the controller including storage for a queue and a mapper; and logic circuitry configured to:

receive a command including the logical address;

map the logical address to a first identifier associated with a chunk;

select a second identifier associated with a stream based on the first identifier using the mapper;

add the second identifier to the command;

place the first identifier in the queue; and remove the first identifier from the queue.

2. A storage device according to claim 1, wherein the mapper includes a Sequential, Frequency, Recency (SFR) table, the SFR table including the first identifier and the second identifier for the first identifier.

3. A storage device according to claim 2, wherein the logic circuitry is further configured to select a previous stream if the logical address is sequential to a second logical address of a previous command.

4. A storage device according to claim 2, wherein the logic circuitry is further configured to:

calculate a recency weight based on a current access time for the first identifier, a previous access time for the first identifier, and a decay period;

adjust an access count for the first identifier based on the recency weight producing an adjusted access count; and adjust the second identifier based on the adjusted access count for the first identifier.

5. A storage device according to claim 1, wherein the mapper includes a node entry, the node entry including the first identifier and the second identifier.

6. A storage device according to claim 5, wherein the logic circuitry is further configured to:

determine that the second identifier is due for promotion based on the first identifier;

promote the second identifier; and place the first identifier in a first of the queue and a second queue corresponding to one or more third identifiers, responsive to the promoted second identifier for the first identifier.

7. A storage device according to claim 6, wherein the logic circuitry is further configured to:

determine that an expiration time for the promoted first identifier has passed;

demote the promoted second identifier; and place the first identifier in a second of the queue and a second queue corresponding to the one or more third identifiers, responsive to the second identifier for the first identifier.

8. An article comprising a non-transitory storage medium, the non-transitory storage medium having stored thereon instructions that, when executed by a host machine, includes:

a receiver to receive a command directed toward a storage device, the command including a logical address;

a mapper to map the logical address to a first identifier associated with a chunk;

stream selection logic to select a second identifier associated with a stream based on the first identifier using the mapper;

an adder to add the second identifier to the command;
a queuer to place the first identifier in a submission queue for delivery to the storage device; and
background logic to remove the first identifier from the submission queue.

9. An article according to claim 8, wherein the mapper includes a Sequential, Frequency, Recency (SFR) table, the SFR table including the first identifier and the second identifier.

10. An article according to claim 9, wherein the background logic includes sequentiality logic to select a previous stream if the logical address is sequential to a second logical address of a previous command.

11. An article according to claim 9, wherein the background logic includes:
recency logic to calculate a recency weight based on a current access time for the first identifier, a previous access time for the first identifier, and a decay period;
an access count adjuster to adjust an access count for the first identifier based on the recency weight producing an adjusted access count; and
an adjuster to adjust the second identifier based on the adjusted access count for the first identifier.

12. An article according to claim 8, wherein the mapper includes a node entry, the node entry including the first identifier and the second identifier.

13. An article according to claim 12, wherein the background logic includes:
promotion logic to promote the second identifier based on the first identifier; and
a second queuer to place the promoted first identifier in a first of the queue and a second queue corresponding to one or more third identifiers responsive to the second identifier.

14. An article according to claim 13, wherein the background logic further comprises:
a comparator to determine that an expiration time for the first identifier has passed;
demotion to decrement the promoted second identifier; and
the second queuer is operative to place the first identifier in a second of the queue and the second queue corresponding to the one or more third identifiers responsive to the second identifier.

15. A method, comprising:
receiving a command from a software source;
determining a logical address in the command;
identifying a first identifier for a chunk on a storage device including the logical address;
accessing a second identifier associated with the first identifier;
assigning the first identifier to the command;
processing the command using the assigned first identifier on the storage device; and
performing a background update of the second identifier associated with the first identifier.

16. A method according to claim 15, further comprising:
determining whether the logical block address is sequential to a second logical address in a second command;
determining the second identifier assigned to the second command; and
assigning the second identifier to the write command.

17. A method according to claim 15, wherein performing a background update of the second identifier associated with the first identifier includes:
adding the first identifier to a queue; and
removing the first identifier from the queue when the first identifier is at a head of the queue.

18. A method according to claim 15, wherein performing a background update of the second identifier associated with the first identifier includes:
increasing an access count for the first identifier;
calculating a recency weight for the first identifier responsive to a current access time and a previous access time for the first identifier;
updating the access count for the first identifier responsive to the recency weight; and
determining the second identifier for the first identifier responsive to the updated access count.

19. A method according to claim 15, wherein performing a background update of the second identifier associated with the first identifier includes placing the first identifier in a queue corresponding to the second identifier, where the queue corresponding to the second identifier is one a first queue and a second queue.

20. A method according to claim 19, wherein performing a background update of the second identifier associated with the first identifier includes:
determining that an expiration time for the first identifier has passed:
removing the first identifier from the queue corresponding to the second;
decrementing the second identifier; and
placing the first identifier in a second queue of the first queue and the second queue corresponding to the decremented second identifier.

21. A method according to claim 15, wherein processing the command using the assigned first identifier on the storage device includes mapping the logical address to a physical address on the storage device.

* * * * *